United States Patent
Kurihara et al.

(10) Patent No.: US 7,754,382 B2
(45) Date of Patent: Jul. 13, 2010

(54) ELECTROCHEMICAL CAPACITOR HAVING AT LEAST ONE ELECTRODE INCLUDING COMPOSITE PARTICLES

(75) Inventors: Masato Kurihara, Tokyo (JP); Tadashi Suzuki, Tokyo (JP); Satoshi Maruyama, Tokyo (JP); Atsushi Sano, Tokyo (JP)

(73) Assignee: TDK Corporation, Tokyo (JP)

( * ) Notice: Subject to any disclaimer, the term of this patent is extended or adjusted under 35 U.S.C. 154(b) by 1328 days.

(21) Appl. No.: 10/901,348

(22) Filed: Jul. 29, 2004

(65) Prior Publication Data

US 2005/0058907 A1 Mar. 17, 2005

(30) Foreign Application Priority Data

| Jul. 30, 2003 | (JP) | ............................ P2003-283029 |
| Jul. 30, 2003 | (JP) | ............................ P2003-283091 |
| Aug. 29, 2003 | (JP) | ............................ P2003-307733 |

(51) Int. Cl.
 *H01M 4/36* (2006.01)
 *H01M 4/62* (2006.01)
 *H01M 4/88* (2006.01)

(52) U.S. Cl. .................... 429/218.1; 429/212; 429/217; 429/232; 252/182.1; 427/79

(58) Field of Classification Search ........................ None
See application file for complete search history.

(56) References Cited

U.S. PATENT DOCUMENTS

| 3,864,169 | A | | 2/1975 | Cestaro et al. |
| 4,379,772 | A | | 4/1983 | Solomon et al. |
| 4,864,462 | A | * | 9/1989 | Madou et al. ................ 361/280 |
| 5,494,762 | A | | 2/1996 | Isoyama et al. |
| 5,800,947 | A | | 9/1998 | Kohler et al. |
| 6,482,547 | B1 | | 11/2002 | Yoon et al. |
| 6,869,730 | B2 | | 3/2005 | Matsubara et al. |
| 7,087,348 | B2 | | 8/2006 | Holman et al. |
| 7,195,844 | B2 | | 3/2007 | Suzuki et al. |
| 7,368,202 | B2 | * | 5/2008 | Kurihara et al. ............. 429/209 |
| 2002/0127473 | A1 | | 9/2002 | Ooya et al. |

(Continued)

FOREIGN PATENT DOCUMENTS

CN 1409418 A 4/2003

(Continued)

OTHER PUBLICATIONS

Online Translation of JP 2002-083585, Monma et al., Mar. 22, 2002.*

(Continued)

*Primary Examiner*—Dah-Wei D Yuan
*Assistant Examiner*—Kwang Han
(74) *Attorney, Agent, or Firm*—Oliff & Berridge, PLC

(57) ABSTRACT

The composite particle for an electrode in accordance with the present invention contains an electrode active material, a conductive auxiliary agent having an electronic conductivity, and an oxidizing/reducing agent. Therefore, this composite particle can construct an effective conductive network, and effectively provide so-called oxidizing/reducing capacity due to the oxidizing/reducing agent. Hence, when the composite particle for an electrode in accordance with the present invention is used as a constituent material of an electrode in an electrochemical device, the electrochemical device can realize a higher capacity.

2 Claims, 19 Drawing Sheets

U.S. PATENT DOCUMENTS

2003/0068550 A1    4/2003    Naoi et al.

FOREIGN PATENT DOCUMENTS

| | | |
|---|---|---|
| JP | A-02-262243 | 10/1990 |
| JP | A 05-114399 | 5/1993 |
| JP | A 9-219190 | 8/1997 |
| JP | A-10-116607 | 5/1998 |
| JP | A 10-199517 | 7/1998 |
| JP | A 10-321465 | 12/1998 |
| JP | A-11-149918 | 6/1999 |
| JP | A-11-329415 | 11/1999 |
| JP | A-2000-011998 | 1/2000 |
| JP | A 2000-40504 | 2/2000 |
| JP | A 2000-123876 | 4/2000 |
| JP | A 2000-149951 | 5/2000 |
| JP | A-2001-118565 | 4/2001 |
| JP | A-2001-217162 | 8/2001 |
| JP | A 2001-351634 | 12/2001 |
| JP | A 2002-083585 | 3/2002 |
| JP | A 2002-157995 | 5/2002 |
| JP | A 2002-203742 | 7/2002 |
| JP | A-2002-231235 | 8/2002 |
| JP | A-2002-334721 | 11/2002 |
| JP | A 2003-109875 | 4/2003 |
| JP | A 2004-247249 | 9/2004 |
| JP | A-2005-078933 | 3/2005 |
| JP | A-2005-078943 | 3/2005 |
| KR | A 2000-0019114 | 4/2000 |
| KR | A 2000-0023090 | 4/2000 |

OTHER PUBLICATIONS

Frackowiak, Elzbieta and Beguin, Francois, Carbon materials for the electrochemical storage of energy in capacitors, May 2001, Elsevier, Carbon vol. 9 Issue 6, pp. 937-950.*

Machine translation of JP 2003-257426, Komaba et al., Sep. 12, 2003.*

Turton et al., "Fluidized Bed Coating and Granulation," 1998, pp. 331-434.

* cited by examiner

B

ELECTROCHEMICAL CAPACITOR HAVING AT LEAST ONE ELECTRODE INCLUDING COMPOSITE PARTICLES

BACKGROUND OF THE INVENTION

1. Field of the Invention

The present invention relates to a composite particle for an electrode, which becomes a constituent material of an electrode usable in an electrochemical device such as a primary battery, a secondary battery (lithium ion secondary battery in particular), an electrolytic cell, and a capacitor (electrochemical capacitor in particular), an electrode and electrochemical device using the same, and methods of making them.

2. Related Background Art

Electrochemical devices such as electrochemical capacitors represented by electric double layer capacitors and batteries represented by lithium ion secondary batteries are easy to reduce their size and weight, and thus are expected to become backup power supplies for power supplies of portable devices (small-size electronic devices) and auxiliary power supplies for hybrid cars, for example.

An electrochemical device is mainly constituted by a pair of electrodes, and an electrolyte layer (e.g., a layer constituted by an electrolytic solution or solid electrolyte). Conventionally, the electrodes are made by the steps of preparing a coating liquid (e.g., in a slurry or paste form) containing an electrode active material (active carbon or the like), a binder (synthetic resin or the like), a conductive auxiliary agent, a dispersant and/or solvent; applying the coating liquid to a surface of a collector (e.g., metal foil); and drying the coating liquid, so as to form a layer containing the electrode active material (hereinafter referred to as "active material containing layer") on the surface of the collector.

In this method (wet method), there is a case where no conductive auxiliary agent is added to the coating liquid. There is also a case (dry method) where, without using the dispersant and solvent, a kneaded product containing the electrode active material, binder, and conductive auxiliary agent is prepared in place of the coating liquid, and this kneaded product is shaped into a sheet by using a heated roller and/or hot press. There is a case where a conductive polymer is further added to the coating liquid, so as to form so-called "polymer electrode". When the electrolyte layer is solid, there is a case where a method including the process of applying the coating liquid to the surface of the electrolyte layer is employed.

The above-mentioned electrochemical device has been under study and development in order to achieve further improved device characteristics (e.g., higher capacity, improved safety, and higher energy density) in conformity to developments in portable devices from now on. In particular, electrochemical capacitors such as electric double layer capacitors have been hard to achieve a further improvement in electrostatic capacity, since there is a limit to the capacity of active carbon or the like used as the electrode active material.

In the field of batteries, for example, a method of making a positive electrode mixture for an organic electrolyte battery comprising the steps of preparing a slurry comprising a positive electrode material (cathode active material), a conductive agent (conductive auxiliary agent), a binder, and a solvent, the slurry having a solid content of 20 to 50 wt % with an average particle size of 10 µm or less; and granulating the slurry by spray drying has been proposed for further improving characteristics such as discharge characteristic and productivity (see, for example, Japanese Patent Application Laid-Open No. 2000-40504).

SUMMARY OF THE INVENTION

However, the inventors have found that electrodes formed by the conventional wet or dry methods and electrodes using a composite particle such as the positive electrode mixture for an organic electrolyte battery disclosed in Japanese Patent Application Laid-open No. 2000-40504, which are mainly composed of an electrode active material, a conductive auxiliary agent, and a binder, have limits when increasing the capacity of electrochemical devices. Namely, the inventors have found that electrochemical devices using conventional electrodes and electrodes constituted by composite particles such as the above-mentioned positive electrode mixture for an organic electrolyte battery are hard to achieve a sufficient device capacity (electrostatic capacity or discharge capacity).

In view of the foregoing problem of the conventional techniques, it is an object of the present invention to provide a composite particle for an electrode, which can form an electrode capable of making an electrochemical device achieve a higher capacity. It is another object of the present invention to provide an electrode enabling an electrochemical device to achieve a higher capacity; and an electrochemical device, equipped with this electrode, having a device capacity sufficiently higher than that conventionally available. It is a further object of the present invention to provide respective manufacturing methods which can yield the composite particle for an electrode, the electrode, and the electrochemical device easily and reliably.

As a result of diligent studies for achieving the above-mentioned objects, the inventors have found that a composite particle for an electrode containing an oxidizing/reducing agent as a constituent material can achieve the objects, thereby accomplishing the present invention.

Namely, the present invention provides a composite particle for an electrode, the composite particle containing an electrode active material, a conductive auxiliary agent having an electronic conductivity, and an oxidizing/reducing agent.

Depending on the electrode to be formed, the "electrode active material" constituting the composite particle for an electrode in the present invention refers to the following materials. Namely, when the electrode to be formed is an electrode used in an electrolytic cell or an electrode used in a capacitor (condenser), the "electrode active material" refers to a metal (including metal alloys), metal oxide, or carbon material. In the specification, "capacitor" is synonymous with "condenser".

When the electrode to be formed is an electrode used as an anode of a primary battery, the "electrode active material" refers to a reducing agent. When the electrode to be formed is an electrode used as a cathode of the primary battery, the "electrode active material" refers to an oxidizing agent.

When the electrode to be formed is an anode (at the time of discharging) used in a secondary battery, the "electrode active material" is a reducing agent while being a material which can exist chemically stably either in its reduced or oxidized state, in which a reducing reaction from the oxidized state to the reduced state and an oxidizing reaction from the reduced state to the oxidized state can proceed reversibly. When the electrode to be formed is a cathode (at the time discharging) used in a secondary battery, the "electrode active material" is an oxidizing agent while being a material which can exist chemically stably either in its reduced or oxidized state, in which a reducing reaction from the oxidized state to the reduced state and an oxidizing reaction from the reduced state to the oxidized state can proceed reversibly.

When the electrode to be formed is an electrode used in a primary or secondary battery, the "electrode active material"

may be a material which can occlude or release (intercalate or dope/undope) a metal ion involved in an electrode reaction. Examples of this material include carbon materials used in the anode and/or cathode of a lithium ion secondary battery and metal oxides (including composite metal oxides).

The "oxidizing/reducing agent" constituting the composite particle for an electrode in the present invention is one having an oxidizing/reducing capability, preferably at least one species selected from an inorganic compound having an oxidizing/reducing capability and an organic polymer compound having an oxidizing/reducing capability. In this specification, a particle constituted by an inorganic compound, polymer, or the like having an oxidizing/reducing capability will be referred to as "redox particle", and an organic polymer having an oxidizing/reducing capability as "redox polymer" as the case may be.

Since the composite particle for an electrode in accordance with the present invention contains an oxidizing/reducing agent as a constituent material, whereas the oxidizing/reducing agent forms the composite particle together with an electrode active material and a conductive auxiliary agent, it can construct an effective conductive network and provide so-called oxidation/reduction capacity due to the oxidizing/reducing agent. Therefore, using the composite particle for an electrode as a constituent material for an electrode of an electrochemical device enables the electrochemical device to attain a higher capacity.

When the oxidizing/reducing agent is an organic polymer having an oxidizing/reducing capability while being able to bind the electrode active material to the conductive auxiliary agent, it is not necessary for the composite particle for an electrode to contain binders other than the oxidizing/reducing agent, since the oxidizing/reducing agent acts as a binder. In this case, the present invention provides a composite particle for an electrode, the composite particle containing an electrode active material, a conductive auxiliary agent having an electronic conductivity, and an organic polymer having an oxidizing/reducing capability and being able to bind the electrode active material to the conductive auxiliary agent.

When the oxidizing/reducing agent does not function as a binder, it is preferred that the composite particle for an electrode in accordance with the present invention further contain a binder capable of binding the electrode active material, conductive auxiliary agent, and oxidizing/reducing agent together. In this case, the present invention provides a composite particle for an electrode, the composite particle containing an electrode active material, a conductive auxiliary agent having an electronic conductivity, an oxidizing/reducing agent, and a binder capable of binding the electrode active material, conductive auxiliary agent, and oxidizing/reducing agent together.

Preferably, in the composite particle for an electrode in accordance with the present invention, the electrode active material and the conductive auxiliary agent are electrically connected to each other without being isolated in the composite particle. More preferably, at least one of the electrode active material and conductive auxiliary agent is physically in contact with the oxidizing/reducing agent in the composite particle.

Here, "the electrode active material and the oxidizing/reducing agent are electrically connected to each other without being isolated in the composite particle" refers to a state in which a particle (or an aggregate thereof) constituted by the electrode active material and a particle (or an aggregate thereof) constituted by the conductive auxiliary agent are electrically connected to each other without being "substantially" isolated in the conductive auxiliary agent. More specifically, it refers to a state where the particle constituted by the electrode active material and the particle constituted by the conductive auxiliary agent are electrically sufficiently connected to each other within such a range that an electric resistance at a level yielding the effect of the present invention can be achieved instead of being completely electrically connected to each other without being isolated.

On the other hand, "at least one of the electrode active material and conductive auxiliary agent is physically in contact with the oxidizing/reducing agent in the composite particle" refers to a state where the oxidizing/reducing agent (an inorganic compound having an oxidizing/reducing capability, an organic polymer compound having an oxidizing/reducing capability, an aggregate thereof, or the like) is physically in contact with at least one of the electrode active material and conductive auxiliary agent without being "substantially" isolated. More specifically, it refers to a state where, when the oxidizing/reducing agent causes an electron transfer upon an oxidizing/reducing reaction, an electron can be transferred between the oxidizing/reducing agent and at least one of the electrode active material and conductive auxiliary agent, so that they attain an electrically combined state without being "substantially" isolated.

The state in which "the electrode active material, conductive auxiliary agent, and oxidizing/reducing agent are electrically connected together without being isolated in the composite particle" and the state in which "at least one of the electrode active material and conductive auxiliary agent is physically in contact with the oxidizing/reducing agent in the composite particle" can be verified by SEM (Scanning Electron Microscope) photographs, TEM (Transmission Electron Microscope) photographs, and analysis data of EDX (Energy Dispersive X-ray Fluorescence Spectrometer) concerning the composite particle for an electrode in accordance with the present invention and its cross section. When SEM photographs, TEM photographs, and EDX analysis data of the composite particle of the present invention are compared with those of the conventional composite particle (disclosed in Japanese Patent Application Laid-Open No. 2000-40504), the former composite particle can clearly be distinguished from the latter. They can also be clearly distinguished from each other when cross sections of electrodes constituted by composite particles for electrodes are verified by SEM photographs, TEM photographs, and EDX analysis data.

When the electrode active material and the conductive auxiliary agent are electrically connected to each other without being isolated in the composite particle, and at least one of the electrode active material and conductive auxiliary agent is physically in contact with the oxidizing/reducing agent in the composite particle as such, the composite particle for an electrode can form an effective conductive network more sufficiently, thus making it possible to fully lower the internal resistance of the electrode and provide an oxidizing/reducing capacity due to the oxidizing/reducing agent more effectively, whereby the electrochemical device can realize a higher capacity more reliably.

Preferably, the composite particle of the present invention is formed by way of a granulating step of bringing the conductive auxiliary agent, binder, and oxidizing/reducing agent into close contact with a particle made of the electrode active material and integrating them together. Preferably, the granulating step is a first, second, or third granulating step which will be explained later.

The first granulating step includes a material solution preparing step of preparing a material solution containing the binder, the conductive auxiliary agent, the oxidizing/reducing agent, and a solvent; a fluidizing step of introducing a particle made of the electrode active material into a fluidized bed so that the particle made of the electrode active material forms a fluidized layer; and a spray-drying step of spraying the material solution into the fluidized layer containing the particle made of the electrode active material, so that the material solution is attached to the particle and dried, removing the solvent from the material solution attached to a surface of the particle made of the electrode active material, and causing the binder to bring the particle made of the electrode active material, a particle made of the conductive auxiliary agent, and the oxidizing/reducing agent into close contact with each other.

The second granulating step includes a material solution preparing step of preparing a first material solution containing a monomer for forming a polymer having an oxidizing/reducing capability upon polymerization, the conductive auxiliary agent, the binder, and a first solvent, and a second material solution containing a polymerization initiator and a second solvent; a fluidizing step of introducing a particle made of the electrode active material into a fluidized bed so that the particle made of the electrode active material forms a fluidized layer; and a spraying/polymerizing/drying step of spraying the first and second material solutions into the fluidized layer containing the particle made of the electrode active material so that the first and second material solutions are attached to the particle made of the electrode active material, bringing the monomer in the first material solution and the polymerization initiator in the second material solution into contact with each other so as to polymerize the monomer such that the polymer having the oxidizing/reducing capability is formed on a surface of the particle made of the electrode active material, removing the first and second solvents from the first and second material solutions attached to the surface of the particle made of the electrode active material by drying, and causing the binder to bring the particle made of the electrode active material, the particle made of the conductive auxiliary agent, and the polymer having the oxidizing/reducing capability into close contact with each other.

The third granulating step includes a material solution preparing step of preparing a first material solution containing a monomer for forming a polymer having an oxidizing/reducing capability upon polymerization, the conductive auxiliary agent, and a first solvent, and a second material solution containing a polymerization initiator and a second solvent; a fluidizing step of introducing a particle made of the electrode active material into a fluidized bed so that the particle made of the electrode active material forms a fluidized layer; and a spraying/polymerizing/drying step of spraying the first and second material solutions into the fluidized layer containing the particle made of the electrode active material so that the first and second material solutions are attached to the particle made of the electrode active material, bringing the monomer in the first material solution and the polymerization initiator in the second material solution into contact with each other so as to polymerize the monomer such that the polymer having the oxidizing/reducing capability is formed on a surface of the particle made of the electrode active material, removing the first and second solvents from the first and second material solutions attached to the surface of the particle made of the electrode active material by drying, and causing the polymer having the oxidizing/reducing capability to bring the particle made of the electrode active material and the particle made of the conductive auxiliary agent into close contact with each other.

In each of the first, second, and third granulating steps (hereinafter collectively referred to as "preferred granulating step"), the "particle made of the electrode active material" and "particle made of the conductive auxiliary agent" may contain materials other than the electrode active material and conductive auxiliary agent, respectively, to such an extent that functions of the present invention (functions as the electrode active material and conductive auxiliary agent) are not lost.

In the composite particle for an electrode in accordance with the present invention formed by way of the above-mentioned preferred granulating step, a particle is formed in a state where the electrode active material and the conductive auxiliary agent are electrically connected together more reliably without being isolated. Also, a particle is formed in a state where at least one of the electrode active material and conductive auxiliary agent is more reliably in physical contact with the oxidizing/reducing agent. Therefore, an effective conductive network can be formed more sufficiently, so that the internal resistance can fully be lowered, and electrochemical capacitors can reliably realize a higher capacity.

In the preferred granulating step, it will be sufficient if droplets of material solutions containing the conductive auxiliary agent and the like can directly be sprayed to a fluidized particle. Therefore, the fluidizing method is not limited in particular. For example, a fluidized bed generating a gas flow for fluidizing particles, a fluidizing bed rotating and fluidizing particles with a stirring blade, a fluidized bed for fluidizing particles by vibration, and the like can be used. From the viewpoint of homogenizing forms and sizes of composite particles obtained, it will be preferred if the fluidizing step of the method of making a composite particle for an electrode generates a gas flow in the fluidized bed, introduces the particle made of the electrode active material into the gas flow, and fluidizes the particle made of the electrode active material.

When an electrode is formed by a conventional electrode forming method, the method uses a coating liquid (slurry) or kneaded product containing at least the electrode active material, conductive auxiliary agent, and binder when forming the electrode. Therefore, the state where the electrode active material, conductive auxiliary agent, and binder in the active material containing layer in the resulting electrode are dispersed is one failing to construct an effective conductive network, e.g., the state of dispersion is nonuniform, so that the constituent materials are isolated from each other and are not electrically connected together. As a consequence, thus obtained electrode has a high internal resistance and is hard to form an electrochemical capacitor having a sufficient capacity.

In conventional methods in which a slurry is granulated by spray drying, such as that of the composite particle disclosed in Japanese Patent Application Laid-Open No. 2000-40504, a positive pole active material (cathode active material), a conductive agent (conductive auxiliary agent), and a binder are contained therein, whereby the state of dispersion of the electrode active material, conductive auxiliary agent, and binder in the resulting granulated product (composite particle) depends on the state of dispersion of the electrode active material, conductive auxiliary agent, and binder in the slurry (the state of dispersion of the electrode active material, conductive auxiliary agent, and binder in the process of drying droplets of the slurry in particular). Therefore, the binder may be aggregated and located unevenly, and the conductive auxiliary agent may be aggregated and located unevenly, whereby the state of dispersion of the electrode active material, conductive auxiliary agent, and binder in the resulting granulated product (composite particle) becomes one failing to construct an effective conductive network, e.g., the state of dispersion is non-uniform so that the constituent materials are isolated from each other and are not electrically connected to each other. Hence, the electrode active material, the conductive auxiliary agent, and the binder fail to attain sufficient adhesion therebetween, whereby no favorable electron conduction path (electron conduction network) is constructed in the resulting active material containing layer.

More specifically, as shown in FIG. 11, particles made of a positive pole active material constituting the resulting mass (composite particle) P100 in the technique shown in Japanese Patent Application Laid-Open No. 2000-40504 include many particles P11 which are surrounded by aggregates P33 made of a large binder and electrically isolated without being utilized in the mass (composite particle) P100. When particles made of a conductive agent become an aggregate during drying, the particles made of the conductive agent are located unevenly as aggregates P22, so that a sufficient electron conduction path cannot be constructed, and a sufficient electronic conductivity cannot be obtained. Further, the aggregates P22 made of the conductive agent may be surrounded by only the aggregates P33 made of a large binder, so as to be electrically isolated, whereby a sufficient electron conduction path cannot be constructed, and a sufficient electronic conductivity cannot be obtained from this viewpoint as well.

Since a conventional electrode uses a large amount of binder having a low insulating property or electronic conductivity together with the electrode active material and the conductive auxiliary agent from the viewpoint of securing a form stability in the electrode, the internal resistance of the electrode increases from this viewpoint as well, whereby a sufficient electronic conductivity cannot be secured. The foregoing problem also occurs in the case where an electrode is produced by using the composite particle disclosed in the above-mentioned Japanese Patent Application Laid-Open No. 2000-40504.

The conventional electrodes fail to bring the conductive auxiliary agent and binder into contact with the electrolyte and disperse them selectively and favorably onto the surface of the electrode active material capable of involving in an electrode reaction, whereby inutile conductive auxiliary agents not contributing to constructing an electron conduction network for efficiently transmitting electrons generated in a reaction field may exist, or inutile binders which merely increase the electric resistance may exist.

In a conventional technique such as that for the composite particle in Japanese Patent Application Laid-Open No. 2000-40504, the state of dispersion of the electrode active material, conductive auxiliary agent, and binder in the coated film becomes nonuniform, whereby the adhesion of the electrode active material and conductive auxiliary agent to the collector cannot be obtained sufficiently.

By contrast, the composite particle for an electrode in accordance with the present invention formed by way of the above-mentioned preferred granulating step can construct an active material containing layer whose resistivity value (or internal resistance value normalized by an apparent volume) is sufficiently lower than that of the electrode active material itself, though the binder causing the electrode to increase the internal resistance of the electrode in general is employed. Further, when the oxidizing/reducing agent can sufficiently bind the electrode active material and the conductive auxiliary agent together, the composite particle for an electrode can be formed without using the binder, whereby the active material containing layer having a sufficiently low resistivity value can be constructed in this case as well.

Since the oxidizing/reducing agent used in the present invention forms a composite particle while in a highly dispersed state, the above-mentioned preferred granulating step can construct a more effective conduction network, and thus can achieve a reduction in the internal resistance and a higher capacity at a high level.

The second and third granulating steps in accordance with the present invention are quite useful in the following points. Namely, conventional manufacturing methods granulating a slurry by spray-drying makes the same slurry contain a constituent material of the composite particle for an electrode, and thus cannot supply a redox polymer in accordance with the present invention in a state of a monomer and a polymerization initiator, for example. By contrast, the second and third granulating steps supply a redox polymer to become a constituent material for the composite particle for an electrode in the state of a monomer (a monomer to become a constituent material for the redox polymer) which can form the redox polymer by a polymerization reaction in the spraying/polymerizing/drying step. Then, a material solution (first material solution) containing this monomer and a material solution (second material solution) containing a polymerization initiator which can start the polymerization reaction of the monomer are sprayed from respective supply ports (nozzles and the like), so as to form the redox polymer on a particle made of the electrode active material. Spraying the redox polymer in the monomer state as such makes it possible to spray droplets much finer than those sprayed in a polymer state, whereby the droplets can be attached onto the particle made of the electrode active material in a quite favorable dispersion state. Since the polymerization of the monomer proceeds even in such a highly dispersed state, the formed redox polymer can keep a quite favorable dispersion state, thereby making it possible to achieve a reduction in internal resistance and a higher capacity at a high level.

When spraying the material solution (first material solution) containing a monomer which can form a redox polymer and the material solution (second material solution) containing a polymerization initiator, it will be effective if the first and second material solutions are sprayed alternately. In this case, the polymerization initiator is sprayed after the first material solution comes into close contact with the electrode active material and the like, so that the monomer which can form the redox polymer causes a polymerization reaction more reliably on the electrode active material, whereby the contact between the redox polymer, electrode active material, conductive auxiliary agent, and the like tends to improve.

In the second and third granulating steps, the material solutions are not limited to the above-mentioned case where the first material solution containing a monomer which can form a redox polymer and a binder used when necessary, and the second material solution containing a polymerization initiator are separated from each other. It will be sufficient if at least the monomer and the polymerization initiator are supplied by respective material solutions different from each other. The conductive auxiliary agent and the binder may be contained in the second material solution. In addition to the first and second material solutions, a third material solution may be prepared so as to contain the conductive auxiliary agent and the binder used when necessary.

The granulating step directly sprays fine droplets of material solutions containing the conductive auxiliary agent, binder, and oxidizing/reducing agent to a particle made of the electrode active material in the fluidized bed. Therefore, as compared with the conventional method of making a composite particle mentioned above, constituent particles constituting the composite particle can fully be prevented from advancing their aggregation, whereby the constituent particles in the resulting composite particle can sufficiently be kept from being located unevenly. Also, this can bring the conductive auxiliary agent, binder, and oxidizing/reducing agent into contact with an electrolytic solution and disperse them selectively and favorably onto the surface of the electrode active material adapted to involve in an electrode reaction.

Thus, the composite particle for an electrode in accordance with the present invention becomes a particle in which the conductive auxiliary agent, electrode active material, binder, and oxidizing/reducing agent are in close contact with each other while in a quite favorable dispersion state. In the preferred granulating step, the particle size of the composite particle for an electrode in accordance with the present invention can be regulated by adjusting the temperature in the fluidized bed, the amount of spraying material solutions in the fluidized bed, the amount of the electrode active material introduced in the gas flow generated in the fluidized bed, the rate of a gas flow generated in the fluidized bed, the mode (laminar flow or turbulent flow) of the gas flow (circulation), etc. This composite particle for an electrode is used as a constituent material for the coating liquid or kneaded product when making the electrode.

A quite favorable electron conduction path (electron conduction network) is three-dimensionally constructed within the composite particle for an electrode. Even after preparing the coating liquid or kneaded product containing this particle, the structure of the electron conduction path makes it easy to keep the initial state substantially by regulating a preparing condition (e.g., selection of a dispersant or solvent when preparing the coating liquid).

Therefore, in the process of forming a liquid film made of a coating liquid or kneaded product containing a composite particle for an electrode onto a surface of a collector and then solidifying the liquid film (e.g., a process of drying the liquid film or the like), the adhesion between individual constituent materials and the adhesion to the collector surface can sufficiently be prevented from decreasing as in conventional cases.

As a result, the inventors infer that an electron conduction path (electron conduction network) much better than that in conventional electrodes is three-dimensionally constructed within the active material containing layer of the electrode used in the present invention.

A quite favorable ion conduction path can easily be constructed within the active material containing layer by carrying out any of techniques of (A) further adding a conductive polymer having an ionic conductivity as a constituent material when forming the composite particle for an electrode; (B) adding a conductive polymer having an ionic conductivity as a constituent other than the composite particle for an electrode when preparing a coating liquid or kneaded product for forming an electrode; and (C) adding a conductive polymer having an ionic conductivity both as a constituent material of a composite particle for an electrode and a constituent of a coating liquid or kneaded product for forming an electrode. The conductive polymer used as a constituent material of the composite particle for an electrode, and the conductive polymer used as a constituent of a coating liquid or kneaded product for forming an electrode may be the same or different from each other.

When a conductive polymer having an ionic conductivity can be used as a binder to become a constituent material of the composite particle for an electrode, the conductive polymer having an ionic conductivity may be used. The binder having an ionic conductivity is also considered to contribute to constructing an ion conduction path within the active material containing layer. The above-mentioned polymer electrode can be formed by using this composite particle for an electrode. A polymer electrolyte having an electronic conductivity may be used as a binder to become a constituent material of the composite particle for an electrode.

Such a configuration allows the present invention to form an electrode having an electronic conductivity and an ionic conductivity which are superior to those of conventional electrodes easily and reliably. In the electrode formed by using the composite particle for an electrode in accordance with the present invention, a contact boundary with respect to the conductive auxiliary agent, electrode active material, and electrolyte (solid electrolyte or liquid electrolyte), which becomes a reaction field of a charge transfer reaction proceeding within the active material containing layer is formed three-dimensionally with a sufficient size, while the state of electric contact between the active material containing layer and the collector is quite favorable.

Since a composite particle for an electrode in which the conductive auxiliary agent, electrode active material, binder, and oxidizing/reducing agent have quite favorable respective dispersion states is formed beforehand, the present invention can fully cut down amounts of addition of the conductive auxiliary agent and binder as compared with those conventionally used.

When the oxidizing/reducing agent is a redox particle made of a redox polymer, the redox particle and the binder may be the same in the present invention.

Preferably, the electrode active material is made of a carbon material having a BET specific surface area of 500 to 4000 m²/g. When the carbon material having such a specific surface area is used as an electrode active material, an electrochemical device (electrochemical capacitor or the like) using this as a constituent material of an electrode tends to improve its static capacity more reliably.

Preferably, in the present invention, each of the electrode active material and oxidizing/reducing agent is formed like a particle, whereas the average particle size R of the particle made of the electrode active material and the average particle size r of the oxidizing/reducing agent satisfy the conditions represented by the following expressions (1) to (3):

$$1 \, \mu m \leq R \leq 100 \, \mu m \tag{1}$$

$$0.001 \, \mu m \leq r \leq 1 \, \mu m \tag{2}$$

$$10^{-5} \leq (r/R) \leq 0.1 \tag{3}$$

When these conditions are satisfied, a composite particle in which the redox particle is closely attached onto the particle made of an electrode active material while in a quite favorable dispersion state, and the conductive auxiliary agent and the binder are in close contact with each other while in a quite favorable dispersion state can be formed, whereby a denser, more effective conductive network can be constructed in the composite particle. Therefore, using such a composite particle for an electrode can achieve a reduction in internal resistance and a higher capacity in a capacitor at a high level. The refractive index particle tends to be hard to handle when its average particle size r is less than 0.001 μm, whereas the reaction rate tends to decrease when the average particle size r exceeds 1 μm. For further improving the reaction rate of the oxidizing/reducing reaction, it will be preferred if a redox particle having an acicular form is used.

In another aspect, the present invention provides an electrode comprising, at least, a conductive active material containing layer containing, as a constituent material, a composite particle including an electrode active material, a conductive auxiliary agent having an electronic conductivity, and an oxidizing/reducing agent; and a conductive collector disposed in a state electrically in contact with the active material containing layer.

Since this electrode comprises the electrode active material layer including as a constituent material the composite particle for an electrode in accordance with the present invention exhibiting the effects mentioned above, the internal resistance is sufficiently reduced therein, and an electrochemical device employing this electrode as an electrode therein can improve the device capacity of the electrochemical device (e.g., the electrostatic capacity of an electrochemical capacitor).

In still another aspect, the present invention provides an electrochemical device comprising, at least, a first electrode, a second electrode, and an electrolyte layer having an ionic conductivity, the first and second electrodes opposing each other by way of the electrolyte layer; wherein at least one of the first and second electrodes is an electrode comprising, at least, a conductive active material containing layer containing as a constituent material a composite particle including an electrode active material, a conductive auxiliary agent having an electronic conductivity, and an oxidizing/reducing agent; and a conductive collector disposed in a state electrically in contact with the active material containing layer.

Here, the "electrolyte layer having an ionic conductivity" refers to (1) a porous separator formed from an insulating material and impregnated with an electrolytic solution (or a gel-like electrolyte obtained when a gelling agent is added to an electrolytic solution); (2) a solid electrolyte film (a film made of a solid polymer electrolyte or a film containing an inorganic material having an ionic conductivity); (3) a layer made of a gel-like electrolyte obtained by adding a gelling agent to an electrolytic solution; or (4) a layer made of an electrolytic solution.

In any of the configurations (1) to (4), the first and second electrodes may contain the respective electrolytes used therein.

In this specification, the laminate composed of the first electrode (anode), electrolyte layer, and second electrode (cathode) in any of the configurations (1) to (3) will be referred to as "matrix," when necessary. The matrix may have not only the three-layer structure such as the configuration of the above-mentioned (1) to (3), but also a configuration of five or more layers in which the electrodes and electrolyte layers are alternately laminated.

In any of the configurations of (1) to (4), the electrochemical device may have a configuration of a module in which a plurality of unit cells are arranged in series or parallel within a case.

The electrochemical device in accordance with the present invention comprises an electrode containing the composite particle for an electrode in accordance with the present invention as at least one of, preferably both of the first and second electrodes, and thus can yield an excellent device capacity.

Also, the present invention provides respective methods of making the composite particle for an electrode, the electrode, and the electrochemical device.

Namely, the present invention provides a method of making a composite particle for an electrode, the method comprising a granulating step of bringing a conductive auxiliary agent and an oxidizing/reducing agent into close contact with a particle made of an electrode active material and integrating them together, so as to form a composite particle containing the electrode active material, conductive auxiliary agent, and oxidizing/reducing agent.

By way of the granulating step, the composite particle for an electrode in accordance with the present invention having the configuration mentioned above can be obtained easily and reliably. Using the composite particle for an electrode obtained by this manufacturing method can easily and reliably form an electrode which has a sufficiently lowered internal resistance and allows an electrochemical device to attain a higher capacity when used therefor, and can easily and reliably construct an electrochemical device having an excellent device capacity.

Preferably, in the method of making a composite particle for an electrode in accordance with the present invention, the granulating step is one of the first, second, and third granulating steps.

The first granulating step in the method of making a composite particle for an electrode in accordance with the present invention includes a material solution preparing step of preparing a material solution containing a binder, the conductive auxiliary agent, the oxidizing/reducing agent, and a solvent; a fluidizing step of introducing a particle made of the electrode active material into a fluidized bed so that the particle made of the electrode active material forms a fluidized layer; and a spray-drying step of spraying the material solution into the fluidized layer containing the particle made of the electrode active material, so that the material solution is attached to the particle and dried, removing the solvent from the material solution attached to a surface of the particle made of the electrode active material, and causing the binder to bring the particle made of the electrode active material, a particle made of the conductive auxiliary agent, and the oxidizing/reducing agent into close contact with each other.

In the first granulating step, "bringing a conductive auxiliary agent and an oxidizing/reducing agent into close contact with a particle made of an electrode active material and integrating them together" refers to the making of a state where a particle made of the conductive auxiliary agent, a particle (redox particle) made of the oxidizing/reducing agent, and a particle made of the binder are in contact with at least a part of a surface of a particle made of the electrode active material. Namely, it will be sufficient if the surface of the particle made of the electrode active material is partly covered with the particle made of the conductive auxiliary agent, the redox particle, and the particle made of the binder, and is not required to be covered completely. The "binder" used in the first granulating step refers to one which can bind the electrode active material, redox particle, and conductive auxiliary agent used together therewith to each other.

From the viewpoint of forming the composite particle for an electrode having the structure mentioned above more easily and more reliably, it is preferred in the first granulating step that the temperature in the fluidized bed be adjusted to a temperature not lower than 50° C. but not higher than a melting point of the binder. Though depending on the species of the binder, the melting point of the binder is about 200° C., for example. When the temperature in the fluidized bed is lower than 50° C., the drying of the solvent during spraying is more likely to become insufficient. When the temperature in the fluidized bed greatly exceeds the melting point of the binder, the binder is more likely to melt, thereby strongly hindering particles from being formed. When the temperature in the fluidized bed is slightly higher than the melting point of the binder, the problem mentioned above can sufficiently be prevented from occurring depending on conditions. The above-mentioned problem does not occur when the temperature in the fluidized bed is not higher than the melting point of the binder.

From the viewpoint of forming the composite particle for an electrode having the structure mentioned above more easily and more reliably, it is preferred in the first granulating step that a gas flow comprising at least one species selected from an air, a nitrogen gas, and an inert gas be generated in the fluidized bed, and a particle made of an electrode active material be introduced into the gas flow, so as to fluidize the particle made of the electrode active material. Further, it is preferred in the first granulating step that the fluidized bed have a humidity (relative humidity) of 30% or less in the preferred temperature range mentioned above. In the present invention, the "inert gas" refers to a gas belonging to a noble gas.

It is preferred in the first granulating step that the solvent contained in the material solution be adapted to dissolve or disperse the binder and redox particle and adapted to disperse the conductive auxiliary agent. This can also enhance the dispersibility of the binder, conductive auxiliary agent, redox particle, and electrode active material in the resulting composite particle for an electrode. From the viewpoint of further enhancing the dispersibility of the binder, conductive auxiliary agent, redox particle, and electrode active material in the composite particle for an electrode, it will be more preferred if the solvent contained in the material solution is adapted to dissolve the binder and adapted to disperse the conductive auxiliary agent. When the redox particle is a particle made of a polymer, it is preferred that the solvent be adapted to dissolve the polymer.

When a particle made of a polymer is used as the redox particle in the first granulating step, the redox particle and the binder may be the same.

In the first granulating step, a conductive polymer can favorably be used as the binder. In this case, the resulting composite particle for an electrode further contains the conductive polymer. Using this composite particle for an electrode can form the polymer electrode mentioned above. The conductive polymer may have either an ionic conductivity or an electronic conductivity. When the conductive polymer is one having an ionic conductivity, a quite favorable ion conduction path (ion conduction network) can be constructed in the active material containing layer of the electrode more easily and more reliably. When the conductive polymer is one having an electronic conductivity, a quite favorable electron conduction path (electron conduction network) can be constructed in the active material containing layer of the electrode more easily and more reliably.

In the first granulating step, the material solution may further contain a conductive polymer dissolved therein. The resulting composite particle for an electrode further contains the conductive polymer in this case as well. Using this composite particle for an electrode can form the polymer electrode mentioned above. The conductive polymer may have either an ionic conductivity or an electronic conductivity. When the conductive polymer is one having an ionic conductivity, a quite favorable ion conduction path (ion conduction network) can be constructed in the active material containing layer of the electrode more easily and more reliably. When the conductive polymer is one having an electronic conductivity, a quite favorable electron conduction path (electron conduction network) can be constructed in the active material containing layer of the electrode more easily and more reliably.

From the viewpoint of reliably attaining a composite particle for an electrode in which a denser, more effective conductive network is constructed, it is preferred in the first granulating step that each of the electrode active material and oxidizing/reducing agent be formed like a particle, whereas the average particle size R of the particle made of the electrode active material and the average particle size r of the oxidizing/reducing agent satisfy the conditions represented by the following expressions (1) to (3):

$$1 \ \mu m \leq R \leq 100 \ \mu m \tag{1}$$

$$0.001 \ \mu m \leq r \leq 1 \ \mu m \tag{2}$$

$$10^{-5} \leq (r/R) \leq 0.1 \tag{3}$$

The second granulating step in the method of making a composite particle for an electrode in accordance with the present invention includes a material solution preparing step of preparing a first material solution containing a monomer for forming a polymer having an oxidizing/reducing capability upon polymerization, the conductive auxiliary agent, a binder, and a first solvent, and a second material solution containing a polymerization initiator and a second solvent; a fluidizing step of introducing a particle made of the electrode active material into a fluidized bed so that the particle made of the electrode active material forms a fluidized layer; and a spraying/polymerizing/drying step of spraying the first and second material solutions into the fluidized layer containing the particle made of the electrode active material so that the first and second material solutions are attached to the particle made of the electrode active material, bringing the monomer in the first material solution and the polymerization initiator in the second material solution into contact with each other so as to polymerize the monomer such that the polymer having the oxidizing/reducing capability is formed on a surface of the particle made of the electrode active material, removing the first and second solvents from the first and second material solutions attached to the surface of the particle made of the electrode active material by drying, and causing the binder to bring the particle made of the electrode active material, the particle made of the conductive auxiliary agent, and the polymer having the oxidizing/reducing capability into close contact with each other.

The third granulating step in the method of making a composite particle for an electrode in accordance with the present invention includes a material solution preparing step of preparing a first material solution containing a monomer for forming a polymer having an oxidizing/reducing capability upon polymerization, the conductive auxiliary agent, and a first solvent, and a second material solution containing a polymerization initiator and a second solvent; a fluidizing step of introducing a particle made of the electrode active material into a fluidized bed so that the particle made of the electrode active material forms a fluidized layer; and a spraying/polymerizing/drying step of spraying the first and second material solutions into the fluidized layer containing the particle made of the electrode active material so that the first and second material solutions are attached to the particle made of the electrode active material, bringing the monomer in the first material solution and the polymerization initiator in the second material solution into contact with each other so as to polymerize the monomer such that the polymer having the oxidizing/reducing capability is formed on a surface of the particle made of the electrode active material, removing the first and second solvents from the first and second material solutions attached to the surface of the particle made of the electrode active material by drying, and causing the polymer having the oxidizing/reducing capability to bring the particle made of the electrode active material and the particle made of the conductive auxiliary agent into close contact with each other.

By way of the second or third granulating step, the composite particle for an electrode in accordance with the present invention having the structure mentioned above can be formed easily and reliably. Using the composite particle for an electrode obtained by this manufacturing method can easily and reliably form an electrode which has a sufficiently reduced internal resistance and can achieve a higher capacity in an electrochemical device when used therefor, and an electrochemical device having an excellent device capacity.

In the second and third granulating steps, "bringing a conductive auxiliary agent, a polymer having an oxidizing/reducing capability (and a binder) into close contact with a, particle made of an electrode active material and integrating them together" refers to the making of a state where a particle made of the conductive auxiliary agent, a polymer (redox polymer) having an oxidizing/reducing capability, and a particle made of the binder used when necessary are in contact with at least a part of a surface of a particle made of the electrode active material. Namely, it will be sufficient if the surface of the particle made of the electrode active material is partly covered with the constituent materials mentioned above, and is not required to be covered completely. The "binder" used in the second and third granulating steps refers to one which can bind the electrode active material, redox polymer, and conductive auxiliary agent used together therewith to each other. When the redox polymer can sufficiently bind the electrode active material and the conductive auxiliary agent to each other, however, the binder is not always necessary.

From the viewpoint of forming the composite particle for an electrode having the structure mentioned above more easily and more reliably, it is preferred in the second and third granulating steps that the temperature in the fluidized bed be adjusted to a temperature not lower than 50° C. but not higher than a melting point of the binder. Though depending on the species of the binder, the melting point of the binder is about 200° C., for example. When the temperature in the fluidized bed is lower than 50° C., the drying of the solvent during spraying is more likely to become insufficient. When the temperature in the fluidized bed greatly exceeds the melting point of the binder, the binder is more likely to melt, thereby strongly hindering particles from being formed. When the temperature in the fluidized bed is slightly higher than the melting point of the binder, the problem mentioned above can sufficiently be prevented from occurring depending on conditions. The above-mentioned problem does not occur when the temperature in the fluidized bed is not higher than the melting point of the binder.

From the viewpoint of forming the composite particle for an electrode having the structure mentioned above more easily and more reliably, it is preferred in the second and third granulating steps that a gas flow comprising at least one species selected from an air, a nitrogen gas, and an inert gas be generated in the fluidized bed, and a particle made of the electrode active material be introduced into the gas flow, so as to fluidize the particle made of the electrode active material. Further, it is preferred in the second and third granulating steps that the fluidized bed have a humidity (relative humidity) of 30% or less in the preferred temperature range mentioned above. In the present invention, the "inert gas" refers to a gas belonging to a noble gas.

It is preferred in the second and third granulating steps that the solvent contained in the material solution be adapted to dissolve or disperse a monomer capable of forming a redox polymer and the binder when the binder is used. This can also enhance the dispersibility of the conductive auxiliary agent, redox polymer, electrode active material, and binder used when necessary in the resulting composite particle for an electrode. From the viewpoint of further enhancing the dispersibility of the binder, conductive auxiliary agent, redox particle, and electrode active material in the composite particle for an electrode, it will be more preferred if the solvent contained in the material solution is adapted to dissolve the monomer capable of forming the redox polymer and the binder when the binder is used, and adapted to disperse the conductive auxiliary agent.

In the second and third granulating steps, a conductive polymer can favorably be used as the binder. In this case, the resulting composite particle for an electrode further contains the conductive polymer. Using this composite particle for an electrode can form the polymer electrode mentioned above. The conductive polymer may have either an ionic conductivity or an electronic conductivity. When the conductive polymer is one having an ionic conductivity, a quite favorable ion conduction path (ion conduction network) can be constructed in the active material containing layer of the electrode more easily and more reliably. When the conductive polymer is one having an electronic conductivity, a quite favorable electron conduction path (electron conduction network) can be constructed in the active material containing layer of the electrode more easily and more reliably.

In the second and third granulating steps, the material solution may further contain a conductive polymer dissolved therein. The resulting composite particle for an electrode further contains the conductive polymer in this case as well. Using this composite particle for an electrode can form the polymer electrode mentioned above. The conductive polymer may have either an ionic conductivity or an electronic conductivity. When the conductive polymer is one having an ionic conductivity, a quite favorable ion conduction path (ion conduction network) can be constructed in the active material containing layer of the electrode more easily and more reliably. When the conductive polymer is one having an electronic conductivity, a quite favorable electron conduction path (electron conduction network) can be constructed in the active material containing layer of the electrode more easily and more reliably.

In still another aspect, the present invention provides a method of making an electrode comprising, at least, a conductive active material containing layer containing as a constituent material a composite particle including an electrode active material, and a conductive collector disposed in a state electrically in contact with the active material containing layer; the method comprising a composite particle forming step of forming a composite particle by way of a granulating step of bringing a conductive auxiliary agent and an oxidizing/reducing agent into close contact with a particle made of the electrode active material and integrating them together so as to form a composite particle containing the electrode active material, conductive auxiliary agent, and oxidizing/reducing agent; and an active material containing layer forming step of forming the active material containing layer by using the composite particle as a constituent material at a part of the collector to be formed with the active material containing layer.

Such a manufacturing method carries out the composite particle forming step by the above-mentioned method of making a composite particle for an electrode, and uses thus obtained composite particle as a constituent material of the active material containing layer. This can easily and reliably yield an electrode in which the internal resistance is sufficiently lowered while enabling an electrochemical device to achieve a higher capacity when used therefor.

Preferably, in the method of making an electrode in accordance with the present invention, the active material containing layer forming step comprises a sheet forming step of heating and pressing a powder containing at least the composite particle so as to form a sheet containing at least the composite particle, and an active material containing layer arranging step of arranging the sheet as the active material containing layer on the collector.

When the active material containing layer is formed by a dry method by using the composite particle in the active material containing layer forming step, an electrode having a sufficiently lowered internal resistance and such an excellent electrode characteristic that the output density of an electrochemical device can sufficiently be enhanced in an easy manner can be obtained more reliably.

Here, the "powder containing at least the composite particle" may be constituted by the composite particle alone. The "powder containing at least the composite particle" may further contain at least one kind of the redox polymer, binder, and conductive auxiliary agent. When the powder contains constituents other than the composite particle, the composite particle in the powder is preferably at least 80 mass % on the basis of the total mass of the powder.

Preferably, in the method of making an electrode in accordance with the present invention, the sheet forming step is carried out by a hot roll press. The hot roll press has a pair of heated rolls, between which the "powder containing at least the composite particle" is introduced, heated, and pressed so as to form a sheet. This can easily and reliably form a sheet to become the active material containing layer.

Though the active material containing layer may be formed by a dry method using the composite particle in the active material containing layer forming step as in the foregoing, the effect of the present invention can also be obtained when the active material containing layer is formed by a wet method as follows.

Namely, the active material containing layer forming step may comprise a coating liquid preparing step of adding the composite particle to a liquid adapted to disperse or knead the composite particle so as to prepare an electrode forming coating liquid; a step of applying the electrode forming coating liquid to a part to be formed with the active material containing layer in the collector; and a step of solidifying a liquid film constituted by the electrode forming coating liquid applied to the part to be formed with the active material containing layer in the collector.

This can also easily and reliably yield an electrode having a sufficiently lowered internal resistance and such an excellent electrode characteristic that the output density of an electrochemical device can sufficiently be enhanced in an easy manner. Here, the "liquid adapted to disperse composite particle" is preferably a liquid which does not dissolve the binder and oxidizing/reducing agent in the composite particle. However, the liquid may have a characteristic of partly dissolving the binder or oxidizing/reducing agent in the vicinity of the surface of the composite particle as long as it can sufficiently secure electric contact between composite particles in the process of forming the active material containing layer and yield the effect of the present invention. At least one species of the binder, conductive auxiliary agent, and oxidizing/reducing agent may further be added as an ingredient other than the composite particle to the liquid adapted to disperse the composite particle within a range where the effect of the present invention is obtained. Preferably, the binder added as the other ingredient in this case is a binder soluble in the "liquid adapted to disperse composite particle".

When the liquid adapted to knead the composite particle is used, the active material containing layer forming step may comprise a kneaded product preparing step of adding the composite particle to the liquid so as to prepare an electrode forming kneaded product containing the composite particle; a step of applying the electrode forming kneaded product to a part to be formed with the active material containing layer in the collector; and a step of solidifying a coating made of the electrode forming kneaded product applied to the part to be formed with the active material containing layer in the collector.

This can also easily and reliably yield an electrode having a sufficiently lowered internal resistance and such an excellent electrode characteristic that the output density of an electrochemical device can sufficiently be enhanced in an easy manner.

In still another aspect, the present invention provides a method of making an electrochemical device comprising, at least, a first electrode, a second electrode, and an electrolyte layer having an ionic conductivity, the first and second electrodes opposing each other by way of the electrolyte layer; the method comprising a composite particle forming step of forming a composite particle by way of a granulating step of bringing a conductive auxiliary agent and an oxidizing/reducing agent into close contact with a particle made of an electrode active material and integrating them together so as to form a composite particle containing the electrode active material, conductive auxiliary agent, and oxidizing/reducing agent; and an electrode forming step of forming at least one of the first and second electrodes by way of an active material containing layer forming step of forming an active material containing layer by using the composite particle at a part to be formed with the active material containing layer in the collector.

When the electrode of the present invention obtained by the above-mentioned method of making an electrode in accordance with the present invention is used as at least one of, preferably both of the first and second electrodes, an electrochemical device having a sufficiently lowered internal resistance and an excellent device capacity can be obtained easily and reliably.

Thus, the present invention can provide a composite particle for an electrode which can form an electrode enabling an electrochemical device to attain a higher capacity. Also, by using this composite particle for an electrode, the present invention can provide an electrode enabling an electrochemical device to attain a higher capacity, and an electrochemical device comprising this electrode and having a device capacity sufficiently higher than that conventionally available.

DESCRIPTION OF THE PREFERRED EMBODIMENTS

In the following, preferred embodiments of the present invention will be explained in detail with reference to the drawings. In the following explanation, parts identical or equivalent to each other will be referred to with numerals identical to each other without repeating their overlapping descriptions.

Figure 1:
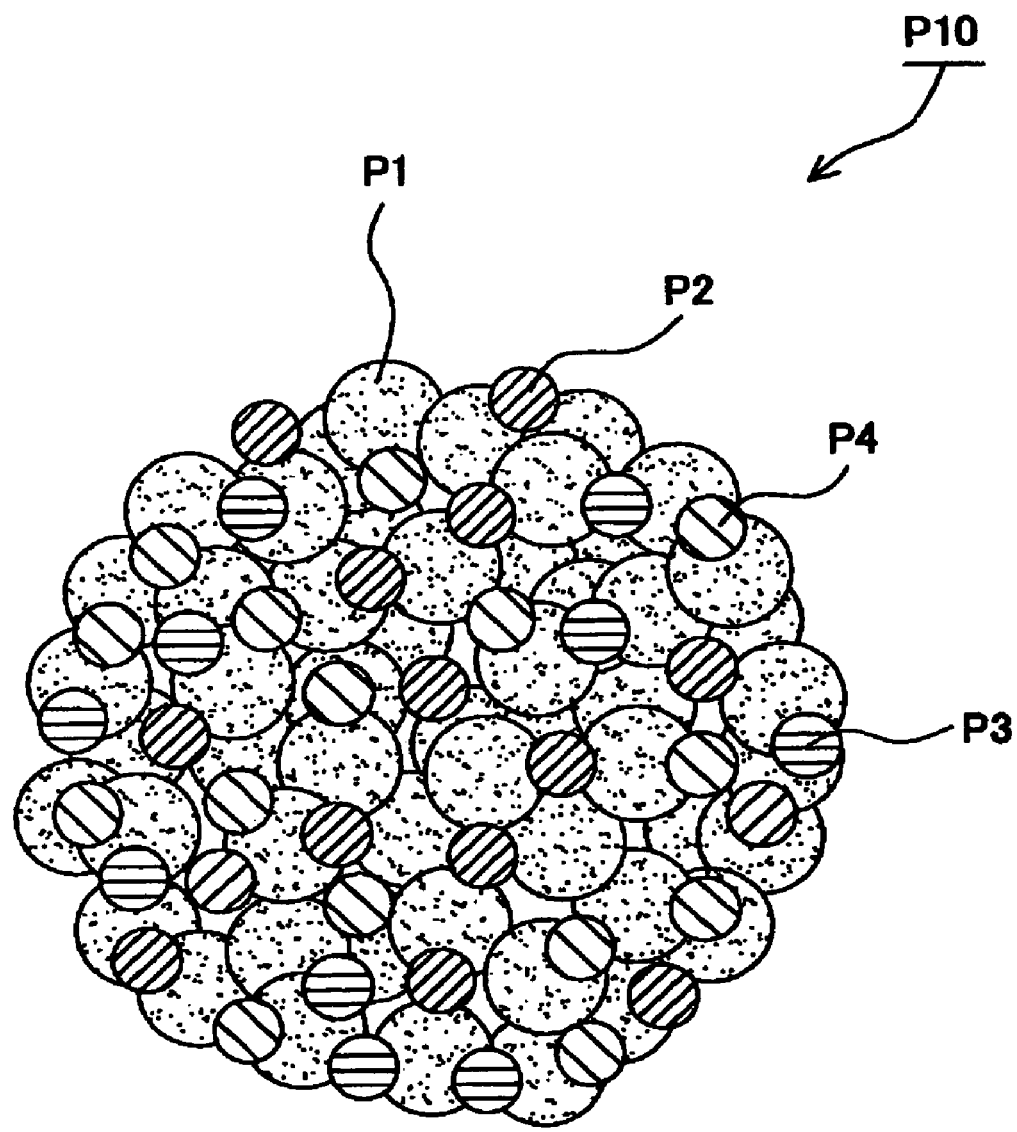
FIG. 1 is a schematic sectional view showing an example of the basic configuration of the composite particle for an electrode in accordance with the present invention.

The composite particle for an electrode in accordance with the present invention will now be explained. FIG. 1 is a schematic sectional view showing the basic configuration of a preferred embodiment of the composite particle for an electrode in accordance with the present invention.

As shown in FIG. 1, a composite particle P10 for an electrode is constituted by particles P1 made of an electrode active material, particles P2 made of a conductive auxiliary agent, particles (redox particles) P3 made of an oxidizing/reducing agent, and particles P4 made of a binder.

Preferably, the redox particles constituting the composite particle P10 for an electrode are particles made of an inorganic compound having an oxidizing/reducing capability or a polymer (redox polymer) having an oxidizing/reducing capability. Examples of the inorganic compound having an oxidizing/reducing capability include transition metal sulfides such as $MoS_2$; metal oxides such as $V_2O_5$, $MnO_2$, $\alpha\text{-}Fe_2O_3$, $RuO_2$, $TiO_2$, $SnO_2$, $IrO_2$, $Ta_2O_5$, $Nb_2O_5$, $SiO_2$, $MoO_3$, $WO_3$, $NiO$, $PbO_2$, $Co_3O_4$, and $TaO_x$; metal nitrides such as $Mo_2N$; composite metal oxides such as $LiMO_2$ and $LiM_2O_4$ (where M is a transition metal such as Co, Ni, Mn, Fe, Cr, V, and Ti and a composite metal composed thereof) and $LiTi_5O_{12}$; and phosphates such as $LiFePO_4$. Examples of the polymer (redox polymer) having an oxidizing/reducing capability include polyaniline, polypyrrole, polythiophene, polymethylthiophene, polybutylthiophene, polyphenylthiophene, polymethoxythiophene, polyethylenedioxythiophene, polyindole, polyparaphenylene, and their derivatives. Preferably, an inorganic compound is used as the redox particle in the present invention.

When the particles P3 made of such an oxidizing/reducing agent are used as a constituent material of the composite particle P10 for an electrode, so-called oxidation/reduction capacity due to the particles P3 made of the oxidizing/reducing agent can be provided. Therefore, using the composite particle P10 for an electrode as a constituent material for an electrode of an electrochemical device enables the electrochemical device to realize a higher capacity.

As the electrode active material constituting the composite particle P10 for an electrode, the following materials are used depending on the electrode to be formed. Namely, when the electrode to be formed is one used in an electrochemical capacitor, the electrode active material is not restricted in particular as long as it is a particle having an electronic conductivity contributing to accumulating and discharging of electric charges. Examples of the electrode active material in this case include activated carbon in a particle or fiber form and metal oxides. Preferred examples of activated carbon include those having a high electric double layer capacity such as coconut shell activated carbon, pitch activated carbon, and phenol resin activated carbon.

The electrode active material used in the electrochemical capacitor preferably has a BET specific surface area of 500 to 4000 $m^2/g$, more preferably 1000 to 3000 $m^2/g$. It will be preferred in particular if a carbon material having such a specific surface area is used. Using such an electrode active material as a constituent material of the composite particle P10 for an electrode can improve the electrostatic capacity of an electrochemical capacitor using this particle as a constituent material of the electrode.

When the electrode to be formed is an anode (at the time of discharging) of a lithium ion secondary battery, known electrode active materials can be used as the electrode active material without any restrictions in particular. Examples of such materials include carbon materials such as graphite which can occlude or release (intercalate or dope/undope) lithium ions, carbon which is hard to become graphite, carbon which is easy to become graphite, and carbon fired at a low temperature; metals such as Al, Si, and Sn adapted to combine with lithium; amorphous compounds mainly composed of oxides such as $SiO_2$ and $SnO_2$; and lithium titanate ($Li_3Ti_5O_{12}$).

When the electrode to be formed is a cathode (at the time of discharging) of a lithium ion secondary battery, known electrode active materials can be used as the electrode active material without any restrictions in particular. Examples of such materials include lithium cobaltate ($LiCoO_2$), lithium nickelate ($LiNiO_2$), lithium manganese spinel ($LiMn_2O_4$), a composite metal oxide represented by a general formula of $LiNi_xMn_yCo_zO_2$ (x+y+1=1), lithium vanadium compound, $V_2O_5$, olivine type $LiMPO_4$ (where M is Co, Ni, Mn, or Fe), and lithium titanate ($Li_3Ti_5O_{12}$).

From the viewpoint of forming a composite particle for an electrode in which a denser, more effective conductive network is constructed, it will be preferred if the average particle size R of the particles P1 made of the electrode active material and the average particle size r of the redox particles P3 satisfy the conditions represented by the following expressions (1) to (3):

$$1\ \mu m \leq R \leq 100\ \mu m \quad (1)$$

$$0.001\ \mu m \leq r \leq 1\ \mu m \quad (2)$$

$$10^{-5} \leq (r/R) \leq 0.1 \quad (3)$$

The conductive auxiliary agent constituting the composite particle P10 is not limited in particular as long as it has an electron conductivity, whereby known conductive auxiliary agents can be used. Examples of the conductive auxiliary agent include carbon materials such as carbon blacks, synthetic graphite with a high crystallinity, and natural graphite; metal fine powders such as copper, nickel, stainless steel, and iron; mixtures of the carbon materials and metal fine powders; and conductive oxides such as ITO.

The binder constituting the composite particle P10 for an electrode is not limited in particular as long as it can bind the particles P3 made of the redox polymer, the particles P1 made of the electrode active material, and the particles P2 made of the conductive auxiliary agent to each other. Examples of the binder include fluorine resins such as polyvinylidene fluoride (PVDF), polytetrafluoroethylene (PTFE), tetrafluoroethylene/hexafluoropropylene copolymer (FEP), tetrafluoroethylene/perfluoroalkylvinylether copolymer (PFA), ethylene/tetrafluoroethylene copolymer (ETFE), polychlorotrifluoroethylene (PCTFE), ethylene/chlorotrifluoroethylene copolymer (ECTFE), and polyvinyl fluoride (PVF). The binder not only binds the constituent materials of the composite particle P10 for an electrode to each other, but also contributes to binding the collector and the composite particle P10 for an electrode to each other when forming an electrode by using the composite particle P10.

Other examples of the binder include vinylidene fluoride type fluorine rubber such as vinylidene fluoride/hexafluoropropylene type fluorine rubber (VDF-HFP type fluorine rubber), vinylidene fluoride/hexafluoropropylene/tetrafluoroethylene type fluorine rubber (VDF-HFP-TFE type fluorine rubber), vinylidene fluoride/pentafluoropropylene type fluorine rubber (VDF-PFP type fluorine rubber), vinylidene fluoride/pentafluoropropylene/tetrafluoroethylene type fluorine rubber (VDF-PFP-TFE type fluorine rubber), vinylidene fluoride/perfluoromethylvinylether/tetrafluoroethylene type fluorine rubber (VDF-PFMVE-TFE type fluorine rubber), and vinylidene fluoride/chlorotrifluoroethylene type fluorine rubber (VDF-CTFE type fluorine rubber).

Other examples of the binder include polyethylene, polypropylene, polyethylene terephthalate, aromatic polyamide, cellulose, styrene/butadiene rubber, isoprene rubber, butadiene rubber, and ethylene/propylene rubber. Also, thermoplastic elastomer-like polymers such as styrene/butadiene/styrene block copolymer, its hydrogenated product, styrene/ethylene/butadiene/styrene copolymer, styrene/isoprene/styrene block copolymer, and its hydrogenated product may be used. Further, syndiotactic 1,2-polybutadiene, ethylene/vinyl acetate copolymer, propylene/α-olefin (with a carbon number of 2 to 11) copolymer, or the like may be used as well. Conductive polymers may be used as well. When the redox particles P3 are particles made of a redox polymer, the redox particles and the binder may be the same.

A particle made of a conductive polymer may further be added to the composite particle P10 as a constituent of the composite particle P10. When forming an electrode by a dry method using the composite particle P10, the composite particle may be added as a constituent of a powder containing at least the composite particle P10. At the time of preparing a coating liquid or kneaded product containing the composite particle P10 when forming an electrode by a wet method using the composite particle P1, a particle made of a conductive polymer may be added as a constituent of the coating liquid or kneaded product.

The conductive polymer used in the present invention is not limited in particular. Examples of the conductive polymer include materials having both functions of an oxidizing/reducing capability and conductivity such as polythiophene, polypyrrol, polyaniline, polyphenylene vinylene, and polyacetone; polyether type polymer compounds such as polyethylene oxide and polypropylene oxide; crosslinked polymers of polyether compounds; and materials in which metals, carbon materials, and the like are dispersed in and complexed with polymers such as polyepichlorohydrin, polyphosphazene, polysiloxane, polyvinylpyrrolidone, polyvinylidene carbonate, and polyacrylonitrile.

When the electrochemical device of the present invention is a lithium ion secondary battery, it will be preferred if the conductive polymer has a lithium ion conductivity. Examples of such a conductive polymer having a lithium ion conductivity include those in which monomers of polymer compounds (polyether polymer compounds such as polyethylene oxide and polypropylene oxide, crosslinked polymers of polyether compounds, polyepichlorohydrin, polyphosphazene, polysiloxane, polyvinylpyrrolidone, polyvinylidene carbonate, polyacrylonitrile, etc.) and lithium salts such as $LiClO_4$, $LiBF_4$, $LiPF_6$, $LiAsF_6$, $LiCl$, $LiBr$, $Li(CF_3SO_2)_2N$, and $LiN(C_2F_5SO_2)_2$ or alkali metal salts mainly composed of lithium are complexed together. An example of the polymerization initiator used for complexing is a photopolymerization initiator or thermal polymerization initiator suitable for the above-mentioned monomers.

Though not restricted in particular, the average particle size of the composite particle P10 for an electrode constituted by such constituent materials is preferably 5 to 5000 μm from the viewpoint of attaining the effect of the present invention more reliably. From the same viewpoint, the average particle size of the particles P1 made of the electrode active material is preferably 1 to 100 μm.

Preferably, from the viewpoint of attaining the effect of the present invention more reliably, the respective contents of the redox polymer, electrode active material, conductive auxiliary agent, and binder in the composite particle P1 for an electrode are 1 to 50 vol %, 40 to 97 vol %, 1 to 30 vol %, and 1 to 30 vol % on the basis of the total volume of the composite particle P10 for an electrode.

Figure 2:
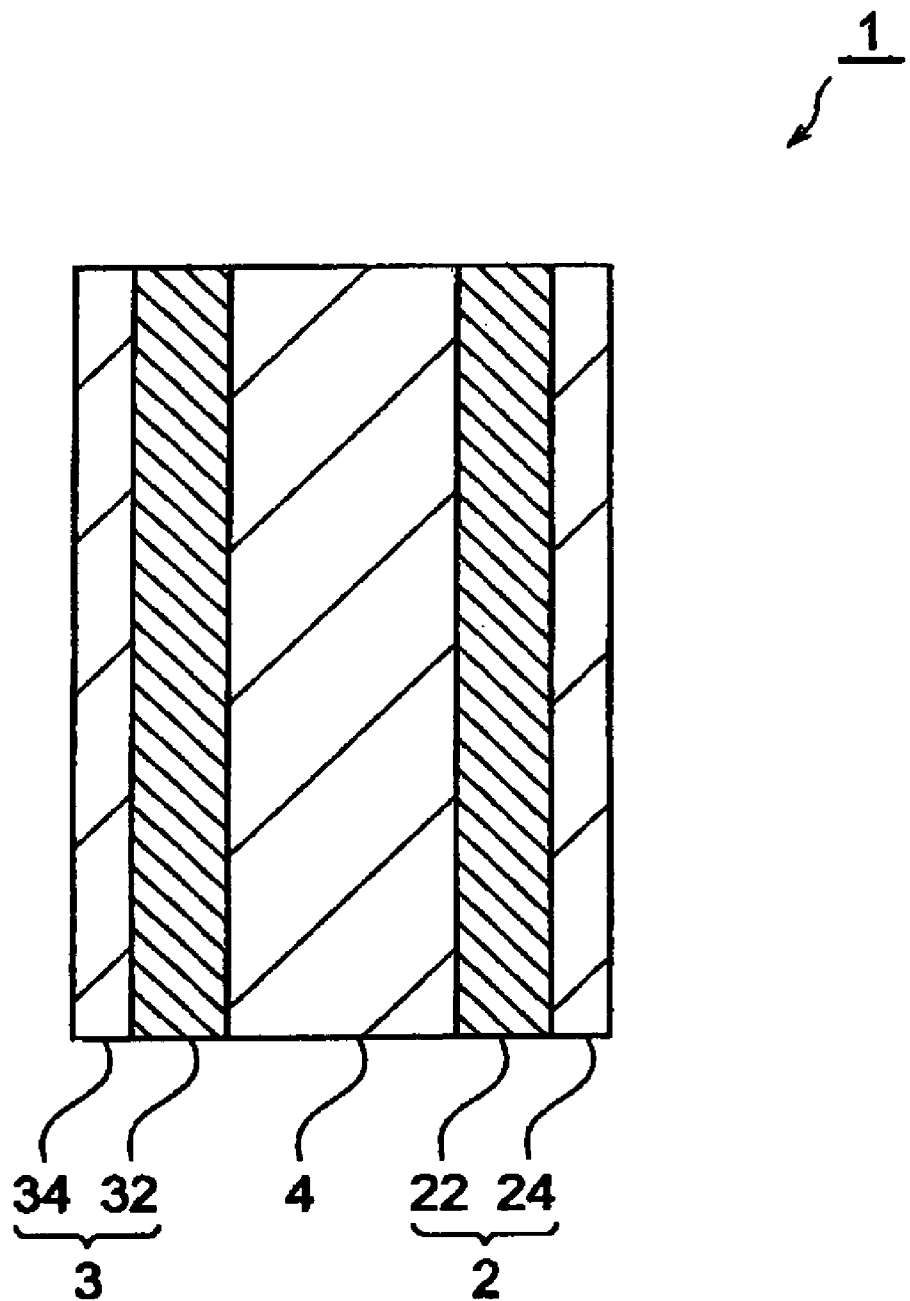
FIG. 2 is a schematic sectional view showing the basic configuration of a preferred embodiment (electric double layer capacitor) of the electrochemical device in accordance with the present invention.

The electrode and electrochemical device in accordance with the present invention will now be explained. FIG. 2 is a schematic sectional view showing the basic configuration of a preferred embodiment (electric double layer capacitor) of the electrochemical device in accordance with the present invention. The electrochemical device 1 shown in FIG. 2 is mainly constituted by a first electrode 2 and a second electrode 3, and an electrolyte layer 4 disposed between the first electrode 2 and second electrode 3.

The first electrode 2 and second electrode 3 shown in FIG. 2 are constituted by respective film-like (sheet-like) collectors 24 and 34, and film-like active material containing layers 22 and 32 disposed between their corresponding collectors and the electrolyte layer 4. The anode and cathode in the electrochemical device 1 are determined according to the respective polarities when discharging and charging the first electrode 2 and second electrode 3, so that one of the first electrode 2 and second electrode 3 becomes the anode, whereas the other becomes the cathode.

The collectors 24 and 34 are not restricted in particular as long as they are conductors which can sufficiently move electric charges to the active material containing layers 22 and 32, whereby collectors used in known electrochemical capacitors can be employed. Specific examples include metal foils of aluminum and the like.

The active material containing layers 22 and 32 are mainly constituted by the above-mentioned composite particle P10 for an electrode in accordance with the present invention. The active material containing layers 22 and 32 may contain materials other than the composite particle P10 for an electrode. For example, they may contain at least one species of the electrode active material, conductive auxiliary agent, redox polymer, and binder separately from the composite particle P10 for an electrode. The active material containing layers 22 and 32 may further contain a conductive polymer.

Preferably, from the viewpoint of attaining the effect of the present invention more reliably, the content of the composite particle P10 for an electrode in each of the active material containing layers 22 and 32 is 80 to 100 mass % on the basis of the total mass of the active material containing layer 22 or 32.

The electrolyte layer 4 can be a layer having any configuration of (1) a porous separator formed from an insulating material and impregnated with an electrolytic solution (or a gel-like electrolyte obtained when a gelling agent is added to an electrolytic solution); (2) a solid electrolyte film (a film made of a solid polymer electrolyte or a film containing an inorganic material having an ionic conductivity); (3) a layer made of a gel-like electrolyte obtained by adding a gelling agent to an electrolytic solution; or (4) a layer made of an electrolytic solution.

Here, the electrolytic solution is not limited in particular, whereby one employed in known electric double layer capacitors can be used. The electrolytic solution has an electrochemically low decomposition voltage, which limits the tolerable voltage of a capacitor to a low voltage, whereby it is preferred that a nonaqueous electrolytic solution using an organic solvent be employed.

Though not limited in particular, the species of the nonaqueous electrolytic solution is selected in view of the solubility and dissociation of a solute and the viscosity of the solution in general, and is preferably a nonaqueous electrolytic solution having a high conductivity and a high potential window (yielding a high decomposition start voltage). Examples of the organic solvent include propylene carbonate, diethylene carbonate, and acetonitrile. An example of the electrolyte is a quaternary ammonium salt such as tetraethylammonium tetrafluoroborate (tetraethylammonium boron tetrafluoride). When the redox particle used in a composite particle to become a constituent material of an electrode is a particle made of an inorganic compound, it will be preferred if one inputting and outputting a cation, such as a lithium ion, is used as the electrolyte. When the redox particle is a particle made of a redox polymer, it will be preferred if one inputting and outputting an anion, such as a quaternary ammonium salt or lithium salt, is used as the electrolyte. In each case, it is necessary that the mingling moisture be controlled strictly.

An example of the solid polymer electrolyte is a conductive polymer having an ionic conductivity, which can appropriately be selected from the above-mentioned conductive polymers for use.

When a separator is used for the electrolyte layer 4, examples of its constituent material include at least one species of polyolefins such as polyethylene and polypropylene (which may be a laminate film or the like of two or more layers when two or more species are used), polyesters such as polyethylene terephthalate, thermoplastic fluorine resins such as ethylene/tetrafluoroethylene copolymer, and celluloses. The sheet may be in the form of microporous film, woven fabric, nonwoven, or the like having an air permeability of about 5 to 2000 sec/100 cc when measured by the method defined in JIS-P8117, and a thickness of about 5 to 100 μm. The separator may be impregnated with monomers of the solid electrolyte, and then the monomers may be cured and polymerized for use. The porous separator may contain the above-mentioned electrolytic solution for use.

A preferred embodiment of the composite particle P10 for an electrode in accordance with the present invention will now be explained.

The composite particle P10 is formed by way of a granulating step of bringing the conductive auxiliary agent, oxidizing/reducing agent, and binder into close contact with the particles P1 made of the electrode active material and integrating them together, thereby forming a composite particle containing the electrode active material, conductive auxiliary agent, redox polymer, and binder. In the present invention, the oxidizing/reducing agent prepared beforehand may be used for the granulating step as in the first granulating step explained later. When the oxidizing/reducing agent is a redox polymer, a monomer forming the redox polymer may be used as a starting material, and the monomer may be polymerized in the granulating step so as to form the redox polymer as in the second or third granulating step explained later.

Figure 3:
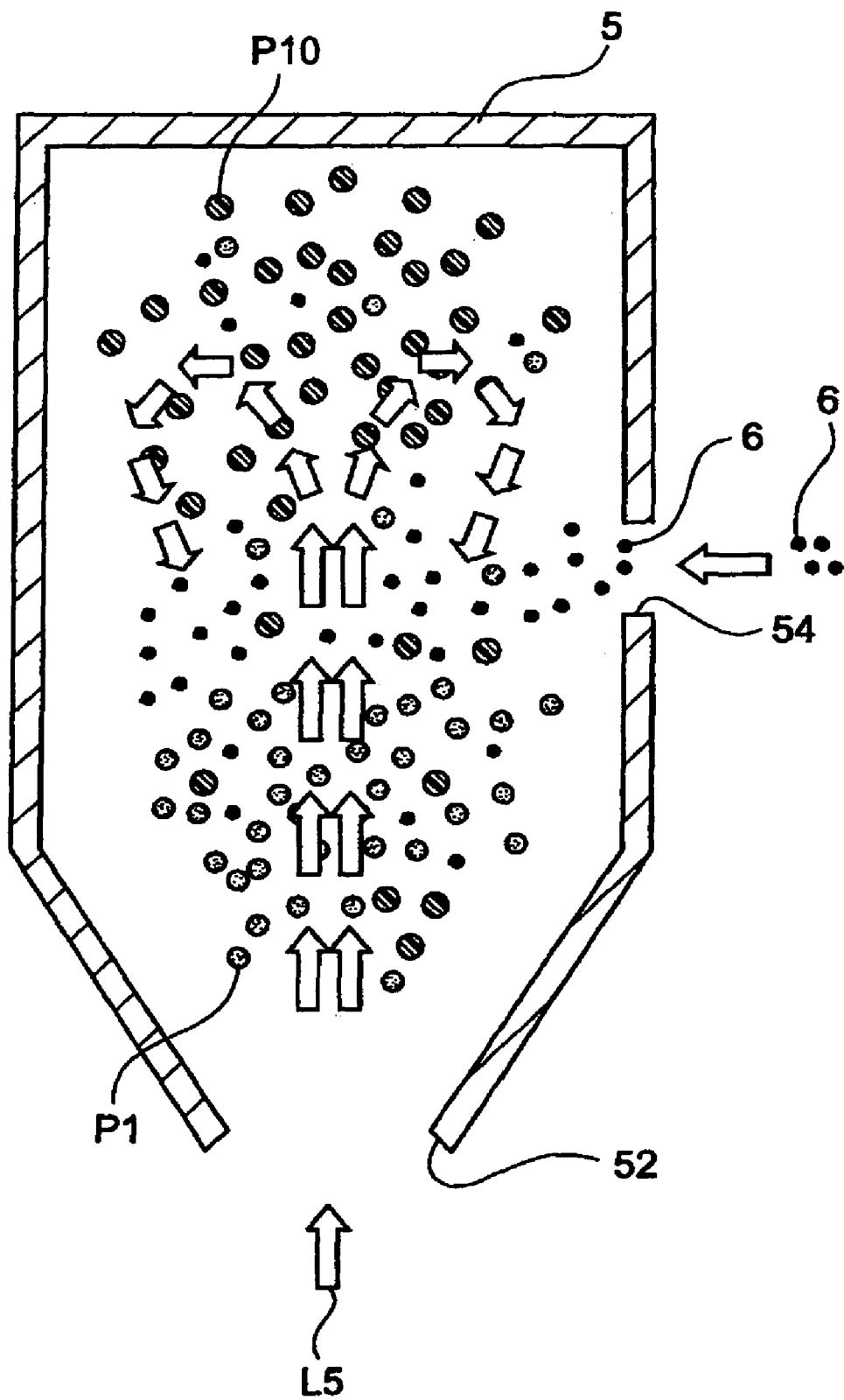
FIG. 3 is an explanatory view showing an example of the granulating step when making an electrode.

With reference to FIG. 3, the first, second, and third granulating steps will now be explained more specifically as preferred granulating steps in accordance with the present invention. FIG. 3 is an explanatory view showing an example of the granulating step when making a composite particle.

The first granulating step includes a material solution preparing step of preparing a material solution containing the binder, the conductive auxiliary agent, the redox particle, and a solvent; a fluidizing step of introducing a particle made of the electrode active material into a fluidized bed so that the particle made of the electrode active material forms a fluidized layer; and a spray-drying step of spraying the material solution into the fluidized layer containing the particle made of the electrode active material, so that the material solution is attached to the particle and dried, removing the solvent from the material solution attached to a surface of the particle made of the electrode active material, and causing the binder to bring the particle made of the electrode active material, a particle made of the conductive auxiliary agent, and the redox particle into close contact with each other.

Initially, in the material solution preparing step in the first granulating step, a solvent adapted to dissolve the binder is used for dissolving the binder therein. Subsequently, the conductive auxiliary agent and the redox particle are dispersed in thus obtained solution, so as to yield a material solution. In the material solution preparing step, the solvent may be one (dispersant) adapted to disperse the binder. When the redox particle is a particle made of a polymer, the solvent may be one adapted to dissolve the polymer.

Subsequently, in the fluidizing step in the first granulating step, a gas flow is generated in the fluidized bed 5, and particles P1 are introduced into the gas flow, so as to fluidize the particles made of the electrode active material as shown in FIG. 3.

Next, in the spray-drying step in the first granulating step, droplets 6 of the material solution are sprayed in the fluidized bed 5 as shown in FIG. 3, so as to be attached to the fluidized particles P1 made of the electrode active material, and are simultaneously dried in the fluidized bed 5, so as to remove the solvent from the droplets 6 of the material solution attached to surfaces of the particles P1 made of the electrode active material, and the binder brings the particles P1 made of the electrode active material and the particles P2 made of the conductive auxiliary agent into close contact with each other, thereby yielding the composite particle P10.

More specifically, for example, the fluidized bed 5 is a container having a tubular form with a bottom part formed with an opening 52 for introducing a warm air (or hot air) L5 from the outside, such that the particles made of the electrode active material are convected within the fluidized bed 5. A side face of the fluidized bed 5 is formed with an opening 54 for introducing the droplets 6 of the material solution to be sprayed to the convected particles P1 made of the electrode active material. The droplets 6 of the material solution containing the binder, conductive auxiliary agent, redox particles, and solvent are sprayed to the particles P1 made of the electrode active material convected within the fluidized bed 5. As the spraying means for spraying the material solution from the opening 54, means for spraying a gas and a liquid, such as high-pressure gas spraying method in particular, is used.

Here, while the temperature of the warm air (or hot air) is regulated, for example, such that the temperature of the atmosphere in which the particles P1 made of the electrode active material are placed is held at a predetermined temperature [preferably a temperature from 50° C. to a temperature not greatly exceeding the melting point of the binder, more preferably a temperature from 50° C. to a temperature (e.g., 200° C.) not higher than the melting point of the binder] at which the solvent in the droplets 6 of the material solution can be removed rapidly, and the liquid film of the material solution formed on the surfaces of the particles P1 made of the electrode active material are dried substantially simultaneously when the droplets 6 of the material solution are sprayed. This brings the binder, conductive auxiliary agent, and redox particle into close contact with the surfaces of the particles made of the electrode active material, thereby yielding the composite particle P10.

Here, the solvent adapted to dissolve the binder is not restricted in particular as long as it can dissolve the binder, disperse the conductive auxiliary agent, and dissolve or disperse the redox particles. For example, N-methyl-2-pyrrolidone, N,N-dimethyl formamide, or the like can be used.

The second granulating step includes a material solution preparing step of preparing a first material solution containing a monomer for forming a redox polymer upon polymerization, the conductive auxiliary agent, the binder, and a first solvent, and a second material solution containing a polymerization initiator and a second solvent; a fluidizing step of introducing a particle made of the electrode active material into a fluidized bed so that the particle made of the electrode active material forms a fluidized layer; and a spraying/polymerizing/drying step of spraying the first and second material solutions into the fluidized layer containing the particle made of the electrode active material so that the first and second material solutions are attached to the particle made of the electrode active material, bringing the monomer in the first material solution and the polymerization initiator in the second material solution into contact with each other so as to polymerize the monomer such that the polymer having the oxidizing/reducing capability is formed on a surface of the particle made of the electrode active material, removing the first and second solvents from the first and second material solutions attached to the surface of the particle made of the electrode active material by drying, and causing the binder to bring the particle made of the electrode active material, the particle made of the conductive auxiliary agent, and the redox polymer into close contact with each other.

The third granulating step includes a material solution preparing step of preparing a first material solution containing a monomer for forming a polymer having an oxidizing/reducing capability upon polymerization, the conductive auxiliary agent, and a first solvent, and a second material solution containing a polymerization initiator and a second solvent; a fluidizing step of introducing a particle made of the electrode active material into a fluidized bed so that the particle made of the electrode active material forms a fluidized layer; and a spraying/polymerizing/drying step of spraying the first and second material solutions into the fluidized layer containing the particle made of the electrode active material so that the first and second material solutions are attached to the particle made of the electrode active material, bringing the monomer in the first material solution and the polymerization initiator in the second material solution into contact with each other so as to polymerize the monomer such that the polymer having the oxidizing/reducing capability is formed on a surface of the particle made of the electrode active material, removing the first and second solvents from the first and second material solutions attached to the surface of the particle made of the electrode active material by drying, and causing the polymer having the oxidizing/reducing capability to bring the particle made of the electrode active material and the particle made of the conductive auxiliary agent into close contact with each other.

Both the second and third granulating steps are preferred granulating steps when the oxidizing/reducing agent is a redox polymer. They can selectively be used depending on whether the redox polymer has a function of binding the electrode active material and the conductive auxiliary agent to each other or not.

When forming the composite particle for an electrode in accordance with the present invention by way of the second or third granulating step, examples of the monomer, contained in the first material solution, for forming the redox polymer upon polymerization are the above-exemplified monomers constituting the redox polymer. The polymerization initiator contained in the second material solution is a thermal polymerization initiator or the like suitable for the monomer. Specific examples include peroxides such as ammonium peroxodisulfate, potassium peroxodisulfate, and hydrogen peroxide; trivalent iron such as iron sulfate (III) and iron chloride (III); divalent copper such as copper sulfate (II) and copper chloride (II); tetravalent cerium such as cerium sulfate (IV), cerium fluoride (IV), and cerium perchlorate (IV); arsenic pentafluoride; and iodine.

When the composite particle for an electrode is formed by way of the second or third granulating step, it is preferred that the content of the monomer contained in the first material solution and adapted to form the redox polymer upon polymerization and the content of the polymerization initiator contained in the second material solution be prepared such that the content of the redox polymer becomes 1 to 50 vol % of the total volume of the composite particle for an electrode when the composite particle for an electrode is formed. The ratio of these contents is appropriately adjusted according to a characteristic (molecular weight or the like) required for the redox polymer formed.

Preferably, in the material solution preparing step in the second granulating step, a solvent adapted to dissolve the binder is used as the first solvent, and the binder is dissolved in the solvent. Subsequently, the monomer capable of forming the redox polymer and the conductive auxiliary agent are dispersed in thus obtained solution, so as to yield the first material solution. In the material solution preparing step in the third granulating step, on the other hand, the monomer capable of forming the redox polymer and the conductive auxiliary agent are dispersed in the first solvent, so as to yield the first material solution. The first solvent may be a solvent (dispersant) adapted to disperse the binder, or a solvent adapted to dissolve the monomer capable of forming the redox polymer.

Preferably, in the material solution preparing step in the second or third granulating step, a solvent adapted to dissolve the polymerization initiator is used as the second solvent, and the polymerization initiator is dissolved in this solvent, so as to yield the second material solution. The second solution may be a solvent (dispersant) adapted to disperse the polymerization initiator.

The binder and the conductive auxiliary agent may be contained in the second material solution, or a third material solution containing the binder, the conductive auxiliary agent, and a third solvent may further be prepared.

Subsequently, in the fluidizing step in the second or third granulating step, a gas flow is generated in the fluidized bed 5, and particles P1 made of the electrode active material are introduced into the gas flow, so as to fluidize the particles made of the electrode active material as shown in FIG. 3.

Next, in the spraying/polymerizing/drying step in the second or third granulating step, droplets 6 of the first material solution and droplets 66 of the second material solution are sprayed in the fluidized bed 5 as shown in FIG. 3, so that the droplets 6 of the first material solution and the droplets 66 of the second material solution are attached to the fluidized particles P1 made of the electrode active material, whereby the monomer in the first material solution and the polymerization initiator in the second material solution are brought into contact with each other on the particles P1 made of the electrode active material. This causes the polymerization reaction of the monomer to proceed, thereby forming the redox polymer on the particles P1 made of the electrode active material. At the same time, the solvents are removed from the droplets 6 of the first material solution and droplets 66 of the second material solution attached to the surfaces of the particles P1 made of the electrode active material by drying in the fluidized bed 5, and the binder or redox polymer brings the particles P1 made of the electrode active material, the particles P2 made of the conductive auxiliary agent, and the particles P3 made of the redox polymer into close contact with each other, so as to yield the composite particle P1.

More specifically, for example, the fluidized bed 5 is a container having a tubular form with a bottom part formed with an opening 52 for introducing a warm air (or hot air) L5 from the outside, such that the particles made of the electrode active material are convected within the fluidized bed 5. A side face of the fluidized bed 5 is formed with an opening (supply port) 54 for introducing the droplets 6 of the first material solution to be sprayed and an opening (supply port) 56 for introducing the droplets 66 of the second material solution to be sprayed to the convected particles P1 made of the electrode active material. The droplets 6 of the first material solution containing the monomer adapted to form the redox polymer upon polymerization, the conductive auxiliary agent, and the first solvent or the binder in addition thereto and the droplets 66 of the second material solution containing the polymerization initiator and the second solvent are sprayed to the particles P1 made of the electrode active material convected within the fluidized bed 5. Here, positions of the openings 54 and 56 are not restricted in particular. The opening 56 may be disposed above or below the opening 54 or a side face on the side opposing the opening 54. As the spraying means for spraying the first and second material solutions from the openings 54 and 56, means for spraying a gas and a liquid, such as high-pressure gas spraying method in particular, is used.

Here, while the temperature of the warm air (or hot air) is regulated, for example, such that the temperature of the atmosphere in which the particles P1 made of the electrode active material are placed is held at a predetermined temperature [preferably a temperature from 50° C. to a temperature not greatly exceeding the melting point of the binder, more preferably a temperature from 50° C. to a temperature (e.g., 200° C.) not higher than the melting point of the binder] at which the solvents in the first and second material solutions can be removed rapidly while the polymerization of the monomer can proceed sufficiently, and the liquid films of the first and second material solutions formed on the surfaces of the particles P1 made of the electrode active material are dried substantially simultaneously with the attachment of the droplets 6 of the first material solution and the droplets 66 of the second material solution and the proceeding of the polymerization of the monomer. This brings the binder, conductive auxiliary agent, and redox particle into close contact with the surfaces of the particles made of the electrode active material, thereby yielding the composite particle P10.

Here, the first solvent adapted to dissolve the binder is not restricted in particular as long as it can dissolve the binder, disperse the conductive auxiliary agent, and dissolve or disperse the monomer capable of forming the redox polymer. For example, N-methyl-2-pyrrolidone, N,N-dimethyl formamide, or the like can be used. The second solvent adapted to dissolve or disperse the binder is not restricted in particular, and those mentioned above for the first solvent can be used, for example. The first and second solvents may be the same or different from each other.

When spraying the material solution (first material solution) containing the monomer capable of forming the redox polymer and the material solution (second material solution) containing the polymerization initiator, it will be effective if they are sprayed alternately. For example, the first material solution is sprayed for 1 second, and then, after an interval of 1 second, the second material solution is sprayed. Subsequently, after an interval of 1 second, the first material solution is sprayed again. This repeated intermittent spraying is effective. This can spray the polymerization initiator after the first material solution comes into close contact with the electrode active material or the like, so that the monomer capable of forming the redox polymer generates a polymerization reaction more reliably on the electrode active material, whereby the contact between the redox polymer, the electrode active material, the conductive auxiliary agent, and the like tends to improve.

A preferred example of the method of forming an electrode using the composite particle P10 will now be explained.

Dry Method

First, a case where an electrode is formed by a dry method using no solvent while employing the composite particle P10 made by way of the above-mentioned granulating step will be explained.

In this case, the active material containing layer is formed by way of the following active material containing layer forming step. The active material containing layer forming step comprises a sheet forming step of heating and pressing a powder containing at least the composite particle P10 so as to form a sheet containing at least the composite particle, and an active material containing layer arranging step of arranging the sheet as the active material containing layer (active material containing layer 22 or 32) on the collector.

The dry method, which is a method of forming an electrode without using a solvent, is advantageous in 1) that it is safe since no solvent is necessary; 2) that the electrode (active material containing layer) can easily attain a higher density since only particles are extended without using the solvent; 3) that aggregations and uneven distributions of the particles P1 made of the electrode active material, the particles P2 made of the conductive auxiliary agent for providing a conductivity, the particles P3 made of the redox polymer, and the particles P4 made of the binder, which become problematic in the wet method, do not occur in the process of drying the liquid film made of the coating liquid for forming an electrode applied onto the collector, since no solvent is used; etc.

Figure 4:
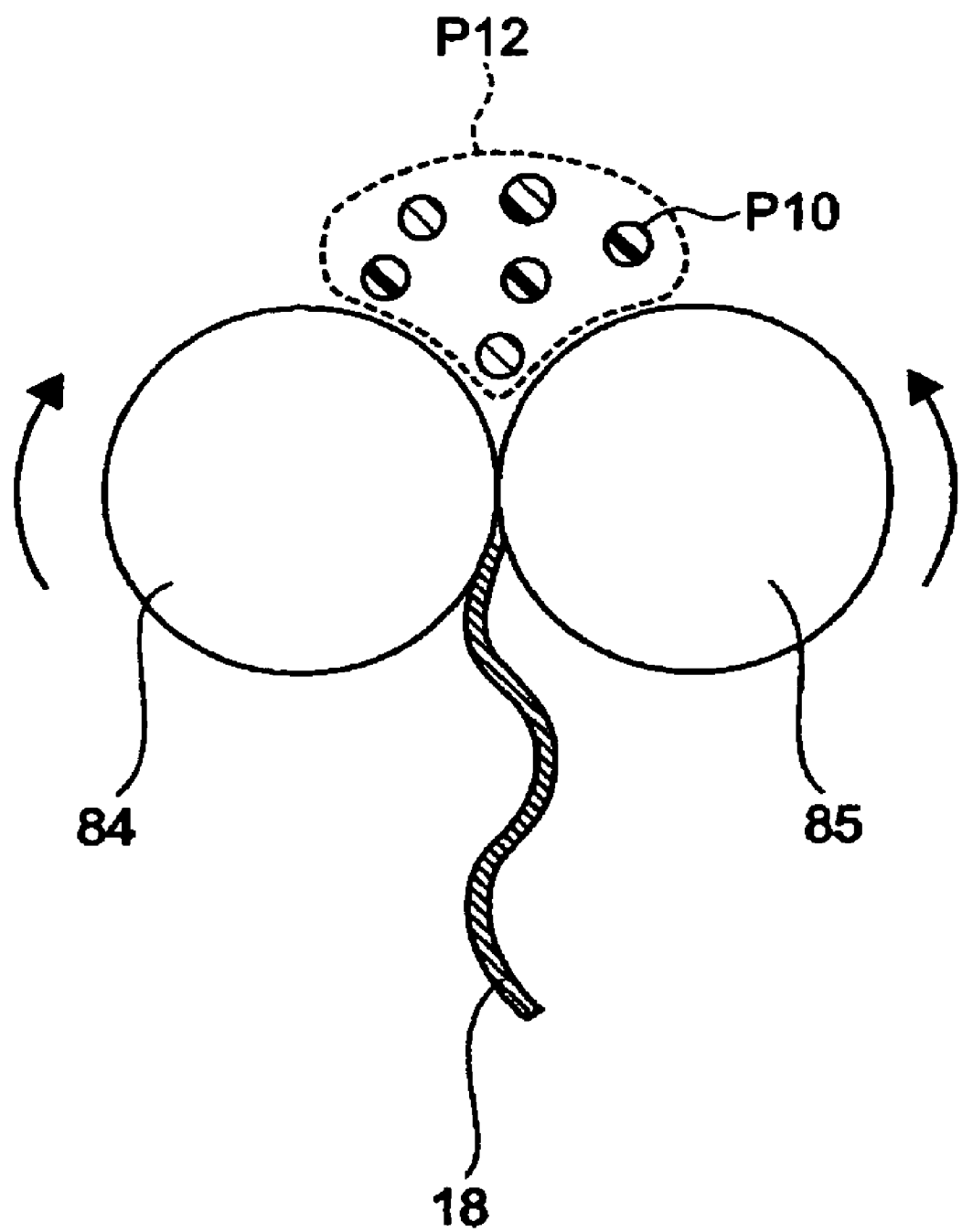
FIG. 4 is an explanatory view showing an example of the sheet forming step when making an electrode by a dry method.

The sheet forming step can favorably be carried out by using a hot roll press shown in FIG. 4.

FIG. 4 is an explanatory view showing an example of the sheet forming step when making an electrode by is the dry method (in the case using the hot roll press).

In this case, as shown in FIG. 4, a powder P12 containing at least the composite particle P10 is introduced between a pair of hot rolls 84 and 85 in the hot roll press (not depicted), so as to be mixed and kneaded, and is extended by a heat and a pressure, so as to be shaped into a sheet 18. Here, the surface temperature of the hot rolls 84 and 85 is preferably 60° to 120° C., whereas their linear pressure is preferably 10 to 5000 kg/cm.

Here, at least one) species of particles selected from the particle P1 made of the electrode active material, the particle P2 made of the conductive auxiliary agent for providing a conductivity, the particle (redox particle) P3 made of an oxidizing/reducing agent, and the particle P4 made of the binder may further be mixed into the powder P12 containing at least the particle P10.

Before being introduced into the hot roll press (not depicted), the powder P12 containing at least the composite particle P10 may be kneaded by mixing means such as a mill.

The collector and the active material containing layer may be brought into electric contact with each other after the active material containing layer is formed by the hot roll press. Alternatively, the collector and the constituent material of the active material containing layer sprayed on one surface of the collector may be supplied to the hot rolls 84 and 85, so that the forming of the sheet of the active material containing layer and the electric connection between the active material containing layer and the collector are effected at the same time.

Wet Method

An example suitable for a case where the composite particle P10 made by way of the above-mentioned granulating step is used, so as to prepare a coating liquid for forming an electrode, which is then used for forming an electrode, will now be explained. First, an example of the method of preparing the coating liquid for forming an electrode will be explained.

The coating liquid for forming an electrode can be obtained by preparing a mixed solution in which the composite particle P10 produced by way of the granulating step and a liquid adapted to disperse or dissolve the composite particle 10 is produced and, while a part of the liquid is removed from the mixed solution, the viscosity of the mixed solution is adjusted to a value suitable for coating, whereby the coating liquid for forming an electrode can be obtained.

Figure 5:
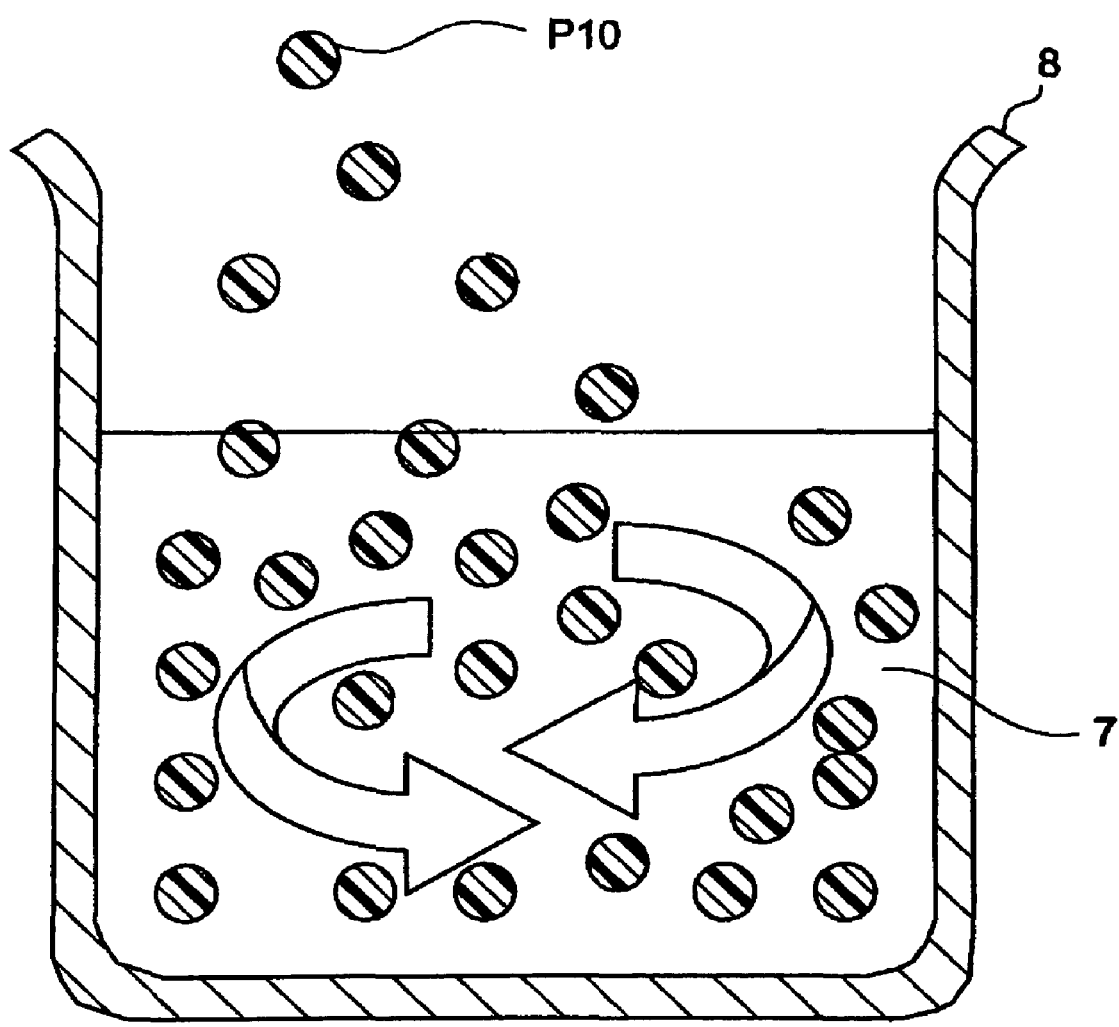
FIG. 5 is an explanatory view showing an example of the coating liquid preparing step when making an electrode by a wet method.

More specifically, when a conductive polymer is used, the composite particle P10 is added to and sufficiently stirred with a liquid adapted to disperse or dissolve the composite particle P10 within a container 8 having predetermined stirring means (not depicted) such as a stirrer as shown in FIG. 5, whereby a coating liquid 7 for forming an electrode can be prepared.

A preferred embodiment of the method of making an electrode in accordance with the present invention using the coating liquid for forming an electrode will now be explained. First, the coating liquid for forming an electrode is applied to the surface of the collector, so as to form a liquid film of the coating liquid on the surface. Subsequently, the liquid film is dried, so as to form an active material containing layer on the collector, thereby completing the making of the electrode. Here, the technique for applying the coating liquid for forming an electrode to the surface of the collector is not limited in particular, and may be determined appropriately according to the material, form, and the like of the collector. For example, metal mask printing, electrostatic coating, dip coating, spray coating, roll coating, doctor blading, gravure coating, etc. may be used.

The technique for forming the active material containing layer from the liquid film of the coating liquid for forming an electrode may accompany a curing reaction between constituents in the liquid film of the coating liquid for forming an electrode (e.g., a polymerization reaction of monomers to become a conductive polymer or the like) when forming the active material containing layer from the liquid film in addition to the drying. For example, when using a coating liquid for forming an electrode containing a monomer to become a constituent material of a UV-curable resin (conductive polymer), the coating liquid for forming an electrode is initially applied onto the collector by the predetermined method mentioned above. Subsequently, the liquid film of the coating liquid is irradiated with UV rays, so as to form an active material containing layer.

In this case, after the liquid film of the coating liquid for forming an electrode is formed on the collector, monomers are polymerized in the liquid film, so as to generate a conductive polymer, whereby the conductive polymer can be generated in gaps between the composite particles P10 while the composite particles P10 substantially keep their favorable state of dispersion. Therefore, the state of dispersion of composite particles P10 and conductive polymers in thus obtained active material containing layer can be made more favorable than that in a case where a conductive polymer (a particle made of a conductive polymer) is contained beforehand in the coating liquid for forming an electrode.

Namely, ion conduction networks and electron conduction networks in which finer, denser particles (particles made of the composite particles P10 and conductive polymers) are integrated can be constructed in the resulting active material containing layer. Therefore, in this case, a polymer electrode having such an excellent polarization characteristic that an electrode reaction can sufficiently advance in a relatively low temperature region can be obtained more easily and more reliably.

Further, in this case, the polymerization reaction of monomers to become a constituent material of the UV-curable resin can be advanced by UV irradiation.

When necessary, thus obtained active material containing layer may be extended by heat treatment with a hot plate press or hot roll, so as to be formed into a sheet or the like.

Though the foregoing explanation relates to a case where a coating liquid 7 for forming an electrode containing the composite particle P10 is prepared and used for forming an electrode as an example of the method of forming an electrode using the composite particle P10, the method of forming an electrode using the composite particle P10 (wet method) is not limited thereto.

Figure 6:
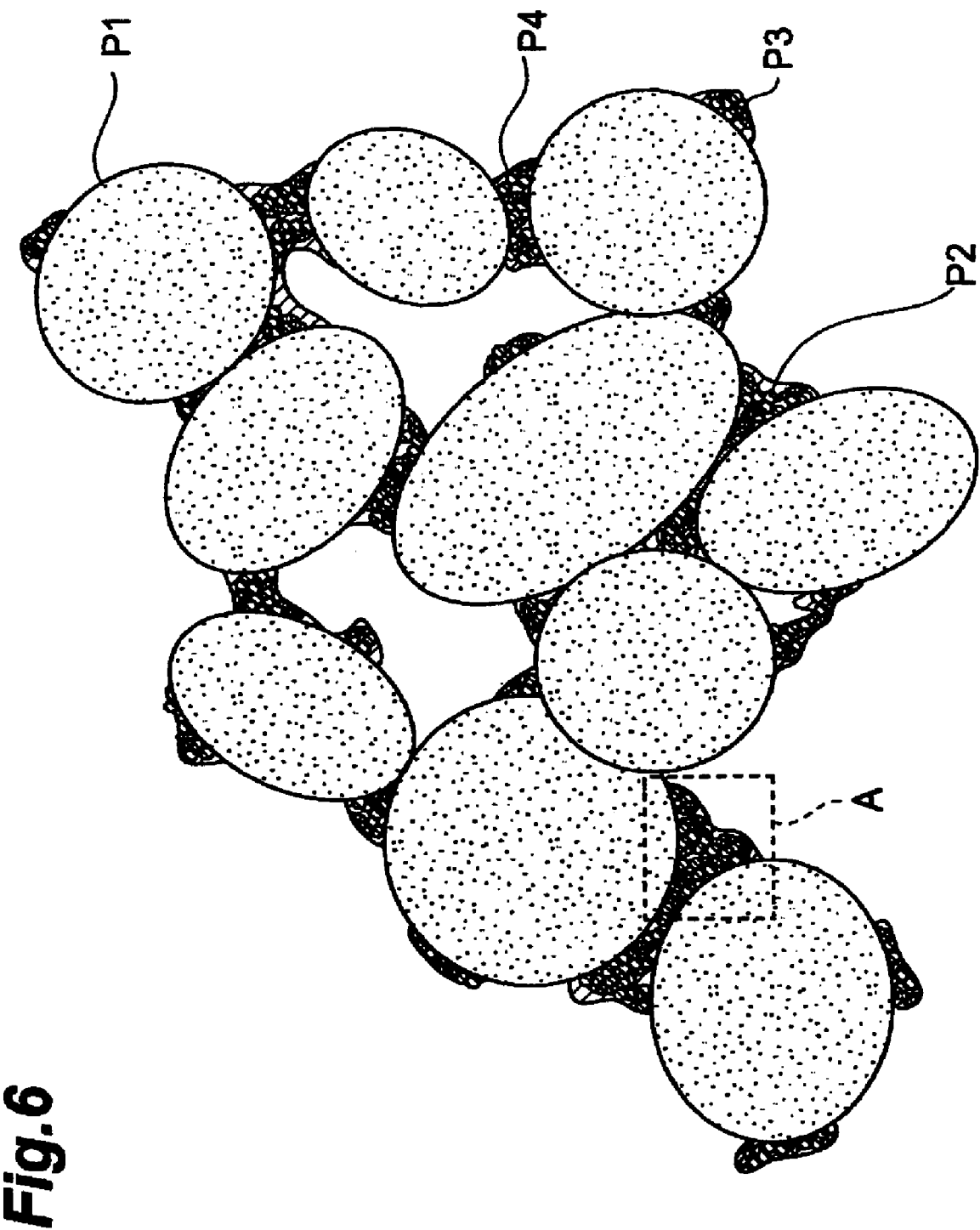
FIG. 6 is a schematic view showing an example of the inner structure of the active material containing layer in the electrode in accordance with the present invention.
Figure 7:
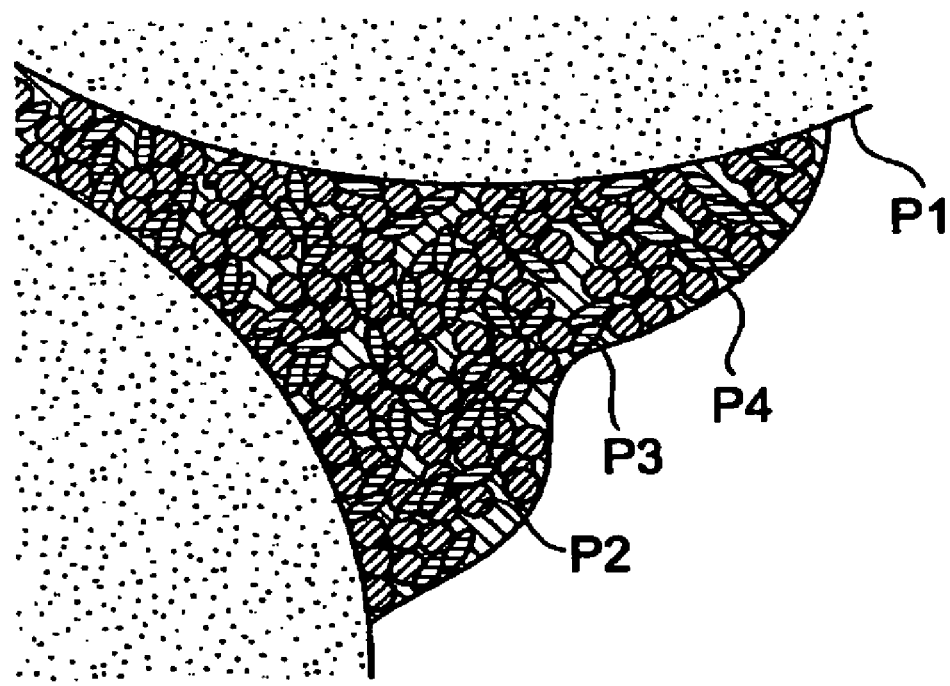
FIG. 7 is an enlarged view showing part A of FIG. 6.

FIGS. 6 and 7 (FIG. 7 being an enlarged view showing part A of FIG. 6) schematically show an example of the inner structure of the active material containing layer (active material containing layer 22 or 32) formed by the wet method and dry method explained in the foregoing. Though the particles P4 made of the binder are used, the active material containing layer (active material containing layer 22 or 32) shown in FIGS. 6 and 7 forms a structure in which the particles P1 made of the electrode active material, the particles P2 made of the conductive auxiliary agent, and the redox particles P3 are electrically connected together without being isolated, and a structure in which at least one of the particle made of the electrode active material and the particle P2 made of the conductive auxiliary agent is physically in contact with the redox particle P3.

Figure 8:
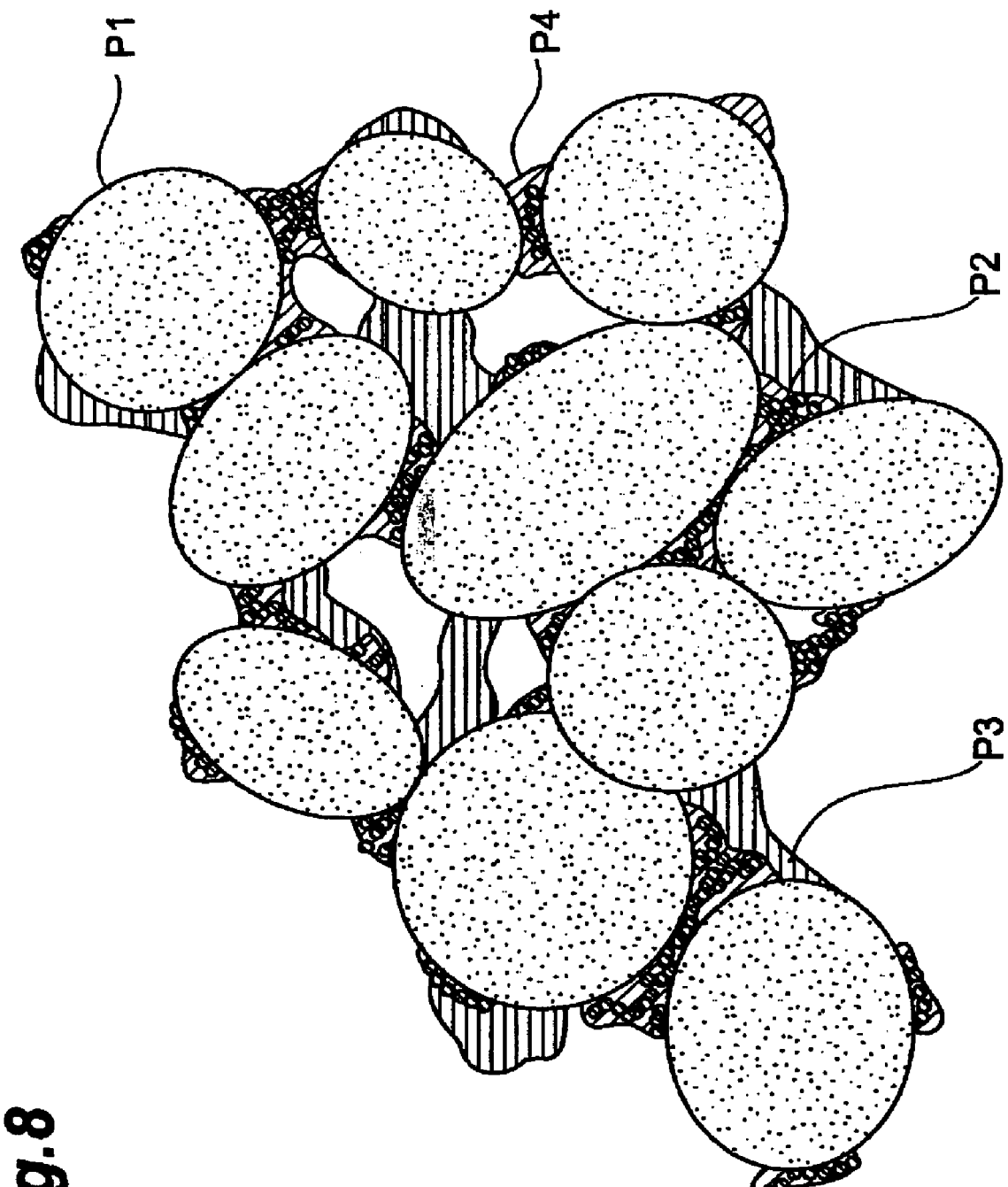
FIG. 8 is a schematic view showing another example of the inner structure of the active material containing layer in the electrode in accordance with the present invention.

FIG. 8 schematically shows another example of the inner structure of the active material containing layer (active material containing layer 22 or 32). The active material containing layer in the schematic view of FIG. 8 is an example in the case where a redox polymer is used as an oxidizing/reducing agent, in which the first and second material solutions contain neither the conductive auxiliary agent nor binder, whereas a material solution containing the conductive auxiliary agent and binder is used as a third material solution, and these material solutions are sprayed so as to produce a composite particle, which is formed as a constituent material. Namely, though the particles P4 made of the binder are used, the active material containing layer (active material containing layer 22 or 32) forms a structure in which the particles P1 made of the electrode active material and the particles P2 made of the conductive auxiliary agent are electrically connected to each other without being isolated, and a structure in which at least one of the particle made of the electrode active material and the particle P2 made of the conductive auxiliary agent is physically in contact with the redox particle P3. When the conductive auxiliary agent and binder are contained in the first material solution or when the conductive auxiliary agent and binder are contained in the second material solution, the particles P4 made of the binder and the particles P3 made of the redox polymer attain a completely homogenous state. In any case, the contact between the redox polymer, electrode active material, and conductive auxiliary agent is kept favorable.

Though preferred embodiments of the present invention are explained in the foregoing, the present invention is not limited to the above-mentioned embodiments.

Figure 9:
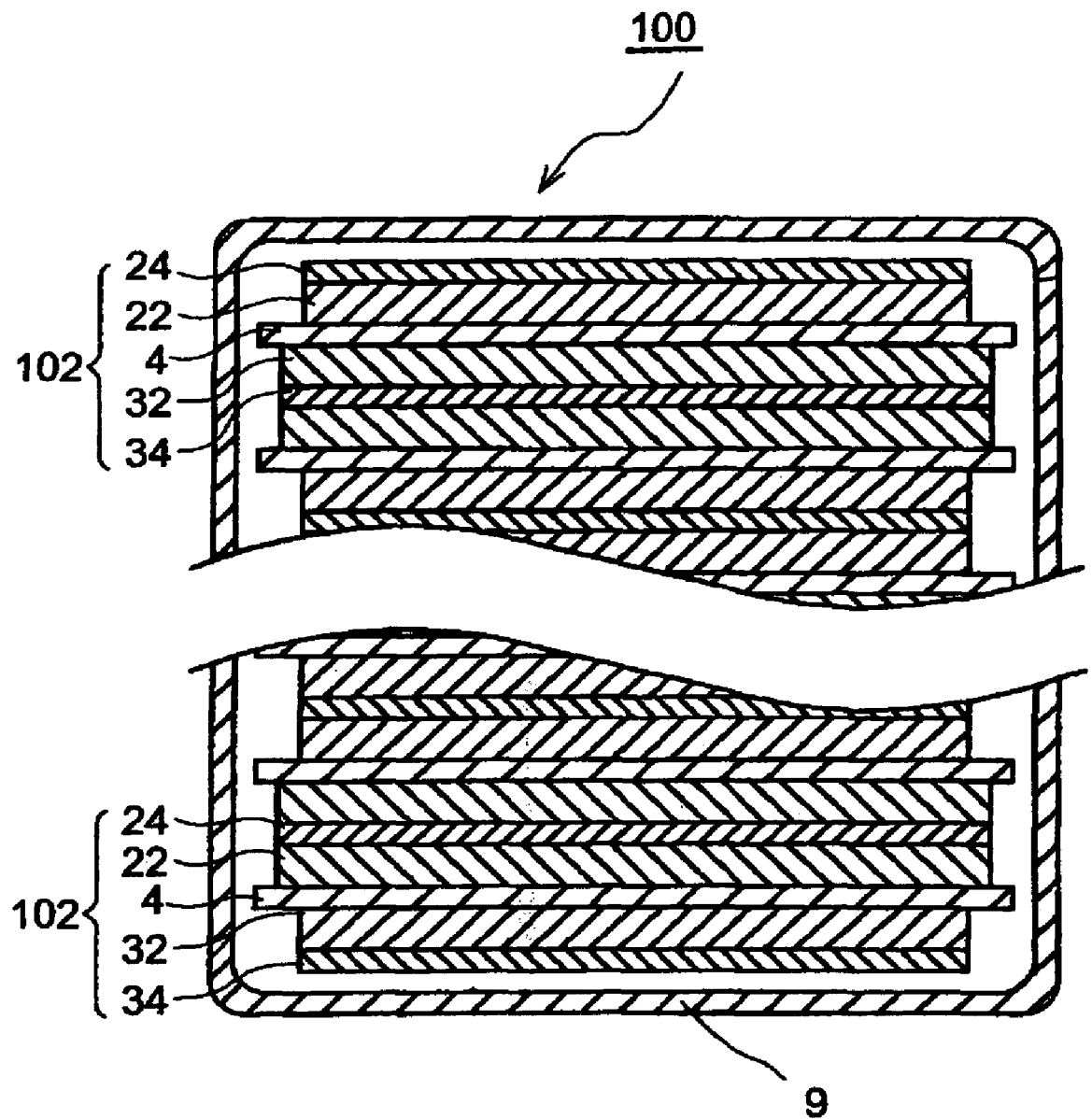
FIG. 9 is a schematic sectional view showing the basic configuration of still another embodiment of the electrochemical device in accordance with the present invention.

For example, the structure of the electrode in accordance with the present invention is not restricted in particular as long as the active material containing layer is formed by use of the composite particle P10 contained in the coating liquid for forming an electrode in accordance with the present invention. The configuration and structure of the electrochemical device are not restricted in particular as long as it comprises the electrode of the present invention as at least one of first and second electrodes. For example, as shown in FIG. 9, the electrochemical device may have a configuration of a module 100 in which a plurality of unit cells 102 (each comprising a first electrode 2, a second electrode 3, and an electrolyte layer 4 also acting as a separator) are laminated and held (packaged) in a closed state within a predetermined case 9.

Figure 10:
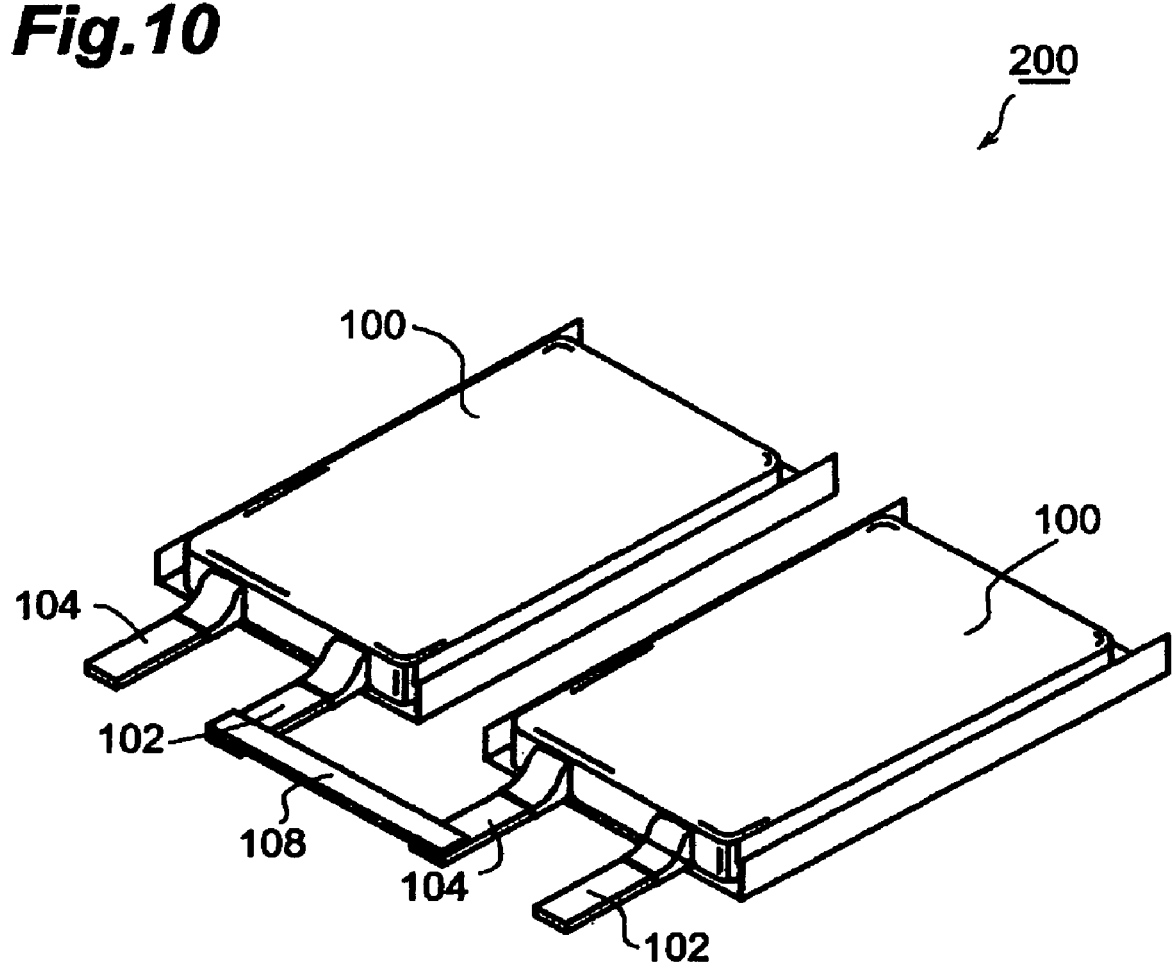
FIG. 10 is a schematic view showing the basic configuration of still another embodiment of the electrochemical device in accordance with the present invention.
Figure 11:
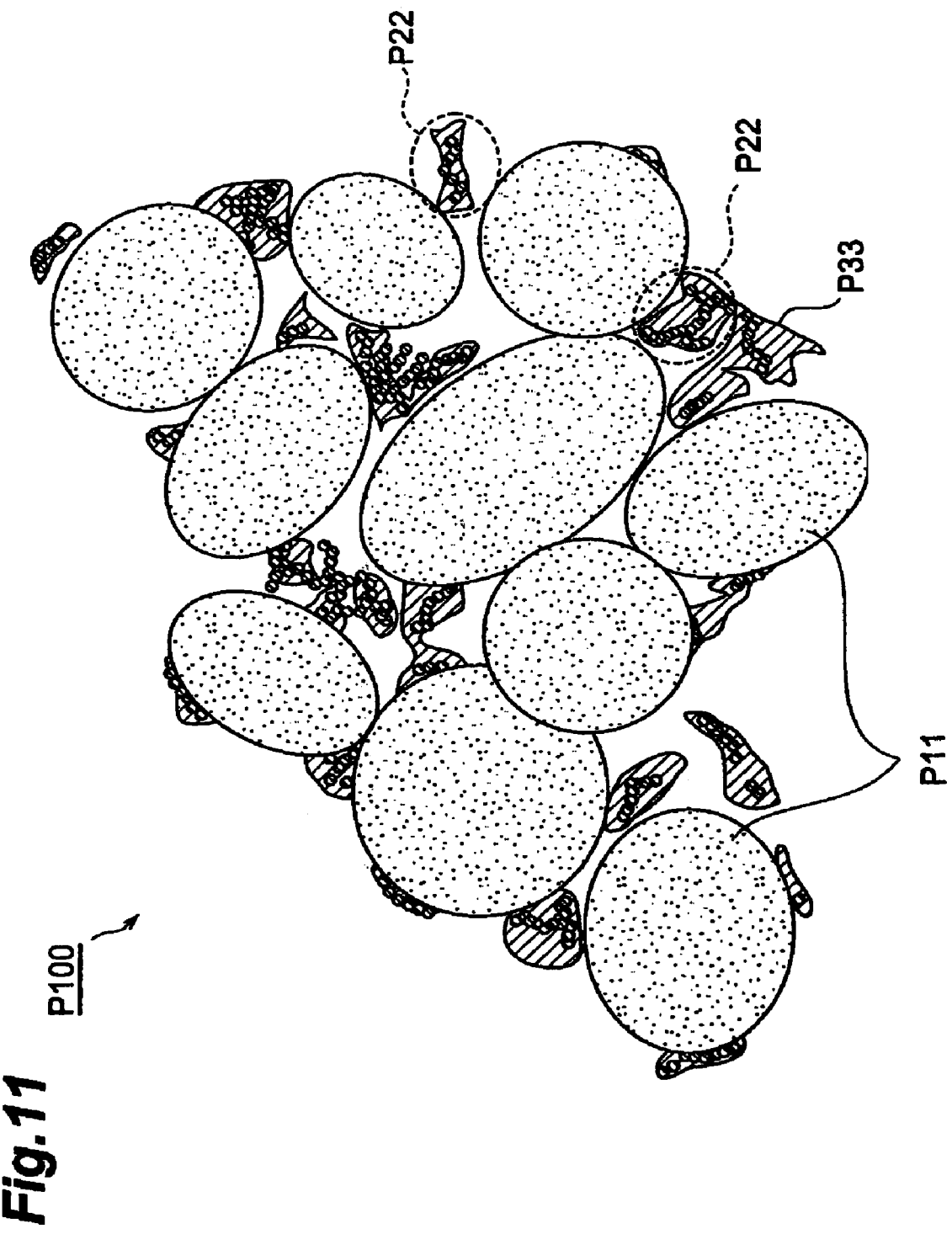
FIG. 11 is a schematic view showing a partial configuration of a conventional composite particle for an electrode and an inner structure of the active material containing layer of the electrode formed by using the conventional composite particle for an electrode.

Further, in this case, the individual unit cells may be connected either in parallel or in series. Also, a device unit in which a plurality of modules 100 are electrically connected in series or in parallel may be constructed. For example, as shown in FIG. 10, a cathode terminal 104 of one module 100 can be electrically connected to anode terminal 106 of another module 100 with a metal strip 108, so as to form a serially connected device unit 200 as the unit mentioned above.

When constructing the above-mentioned module 100 or device unit 200, a protection circuit (not depicted) or PTC (not depicted) similar to that provided in a known electrochemical device may further be provided when necessary.

Though the explanation of the above-mentioned embodiment of the electrochemical device relates to an electrochemical capacitor having a configuration of an electric double layer capacitor, it is not restrictive. For example, it may be an electrochemical capacitor such as aluminum electrolytic capacitor, pseudo-capacity capacitor, pseudocapacitor, or redox capacitor.

The electrochemical device of the present invention may be a primary battery or secondary battery. For example, when the electrochemical device of the present invention is a lithium ion secondary battery, electrodes made of the following constituent materials are used as its electrodes (anodes and cathodes). Namely, as collectors, the anode and cathode use a copper foil and an aluminum foil, respectively, for example. The active material containing layer is formed while containing the composite particle for an electrode in accordance with the present invention as a constituent material. The electrode active materials to become a constituent material of the composite particle when used as the anode and cathode of the lithium ion secondary battery are as explained in the foregoing.

When the electrochemical device of the present invention is a metal lithium secondary battery, its anode may be an electrode, made of metal lithium or a lithium alloy alone, also acting as a collector. Here, the lithium alloy is not limited in particular, and may be alloys such as L-Al, LiSi, and LiSn (LiSi being regarded as an alloy here), for example. In this case, the cathode is constructed by using the composite particle for an electrode in accordance with the present invention.

When the electrochemical device of the present invention is a lithium ion secondary battery or metal lithium secondary battery, the electrolytic solution used in the electrolyte layer 4 is prepared by dissolving a lithium-containing electrolyte into a nonaqueous solvent. The lithium-containing electrolyte may appropriately be selected from $LiClO_4$, $LiBF_4$, $LiPF_6$, etc., for example, and a lithium imide salt such as $Li(CF_3SO_2)_2$ and $Li(C_2F_5SO_2)_2N$, $LiB(C_2O_4)_2$, or the like may be used as well. The nonaqueous solvent may be selected from organic solvents such as ethers, ketones, and carbonates exemplified in Japanese Patent Application Laid-Open No. SHO 63-121620 and the like, for example, among which the carbonates are preferably used in the present invention in particular. Among the carbonates, a mixed solvent mainly composed of ethylene carbonate with at least one species of other solvents added thereto is preferably used in particular. It will usually be preferred if ethylene carbonate/other solvent=5 to 70:95 to 30 (volume ratio). Ethylene carbonate has a high coagulation point of 36.4° C., and thus is solidified at a normal temperature. Therefore, ethylene carbonate cannot be used by itself as an electrolytic solution for a battery. When at least one species of other solvents having a low coagulation point is added thereto, the mixed solvent lowers its coagulation point and thus becomes usable. The other solvents in this case may be any solvents as long as they can lower the coagulation point of ethylene carbonate. Their examples include diethyl carbonate, dimethyl carbonate, propylene carbonate, 1,2-dimethoxyethane, methylethyl carbonate, γ-butyrolactone, γ-valerolactone, γ-octanoic lactone, 1,2-diethoxyethane, 1,2-ethoxymethoxyethane, 1,2-dibutoxyethane, 1,3-dioxolane, tetrahydrofuran, 2-methyltetrahydrofuran, 4,4-dimethyl-1,3-dioxane, butylene carbonate, and methyl formate. Using a carbonaceous material as an active material for the anode together with the above-mentioned mixed solvent can remarkably improve the battery capacity and sufficiently lower the irreversible capacity ratio.

When a solid polymer electrolyte is used for the electrolyte layer 4 constituting a lithium ion secondary battery or metal lithium secondary battery, the solid polymer electrolyte is constituted by the above-mentioned conductive polymer (in which a monomer of a polymer compound and a lithium salt or an alkali metal salt mainly composed of lithium are complexed), for example. Examples of a supporting electrolyte constituting the solid polymer electrolyte include salts such as $LiClO_4$, $LiPF_6$, $LiBF_4$, $LiAsF_6$, $LiCF_3SO_3$, $LiCF_3CF_2SO_3$, $LiC(CF_3SO_2)_3$, $LiN(CF_3CF_2SO_2)_2$, $LiN(CF_3SO_2)(C_4F_9SO_2)$, and $LiN(CF_3CF_2CO)_2$, and their mixtures.

Thus obtained composite particle for an electrode and the electrode in accordance with the present invention can be utilized in electrochemical devices, i.e., electrochemical capacitors such as electric double layer capacitors and batteries such as lithium ion secondary batteries. The electrochemical device in accordance with the present invention can be utilized for backup power supplies for power supplies of portable devices (small-size electronic devices) and auxiliary power supplies for hybrid cars, for example.

EXAMPLES

In the following, the present invention will be explained in more detail with reference to Examples and Comparative Examples, though the present invention is not restricted thereto at all.

Example 1

Making of Composite Particle

First, steam-activated carbon in a short fiber form (having a BET specific surface area of 2500 $m^2/g$ and an average particle size (shorter diameter) of 17 μm) as an electrode active material, $\alpha$-$Fe_2O_3$ in an acicular form (having a diameter of about 20 to 30 nm and a length of about 50 to 100 nm) as a redox particle, acetylene black as a conductive auxiliary agent, and polyvinylidene fluoride as a binder were prepared.

In a solution in which polyvinylidene fluoride was dissolved in N,N-dimethylformamide, $\alpha$-$Fe_2O_3$ and acetylene black were dispersed, so as to prepare a material solution (constituted by 1 mass % of $\alpha$-$Fe_2O_3$, 1 mass % of acetylene black, and 3 mass % of polyvinylidene fluoride). This material solution was sprayed to active carbon particles fluidized by a gas flow constituted by the air within a container having the same configuration as with the fluidized bed 5 shown in FIG. 3, so as to adhere to surfaces of the active carbon particles. The temperature of the atmosphere in which the active carbon particles were placed at the time of spraying was held at 80° C., so as to remove N,N-dimethylformamide substantially simultaneously with the spraying. Subsequently, $\alpha$-$Fe_2O_3$, acetylene black, and polyvinylidene fluoride were brought into close contact with surfaces of active carbon particles such that the mass ratio of active carbon/$\alpha$-$Fe_2O_3$/acetylene black/polyvinylidene fluoride became 75:5:5:15, whereby composite particles (having an average particle of about 150 μm) were obtained.

Making of Active Material Containing Layer

An active material containing layer was prepared by the above-mentioned dry method. First, using a hot roll press having the same configuration as that shown in FIG. 4, with composite particles (having an average particle of about 150 μm) added thereto, a sheet (having an average particle of 150 μm and a width of 5 cm) to become the active material containing layer was produced. Here, the heating temperature was 100° C., whereas the pressing condition was a linear pressure of 250 kg/cm. Next, the sheet was punched out into a circle having a diameter of 15 mm, so as to yield a disk-shaped active material containing layer weighing about 20 mg.

Example 2

Composite particles (having an average particle of about 150 μm) were obtained in the same manner as with Example 1 except that $\alpha$-$Fe_2O_3$, acetylene black, and polyvinylidene fluoride were brought into close contact with surfaces of active carbon particles such that the mass ratio of active carbon/$\alpha$-$Fe_2O_3$/acetylene black/polyvinylidene fluoride became 90:2:2:6. Also, an active material containing layer was obtained in the same manner as with Example 1 except that these composite particles were used.

Comparative Example 1

In a solution in which polyvinylidene fluoride was dissolved in N,N-dimethylformamide, acetylene black was dispersed, so as to prepare a material solution (constituted by 2 mass % of acetylene black and 3 mass % of polyvinylidene fluoride). Composite particles (having an average particle size of about 150 μm) were obtained in the same manner as with Example 1 except that this material solution was used and that acetylene black and polyvinylidene fluoride were brought into close contact with surfaces of active carbon particles such that the mass ratio of active carbon/acetylene black/polyvinylidene fluoride became 90:4:6. Also, an active material containing layer was obtained in the same manner as with Example 1 except that these composite particles were used.

Electrode Characteristic Evaluation Test

First, respective electrodes made of active material containing layers of Examples 1 to 2 and Comparative Example 1 as cathodes, an electrode made of a metal lithium foil (having a diameter of 15 mm and a thickness of 200 μm) as an anode, and a solution in which $LiClO_4$ was dissolved in a solvent (propylene carbonate) such that its volumetric molar concentration became 1 mol/L as an electrolytic solution were prepared. Subsequently, a porous separator constituted by the active material containing layer and cellulose was impregnated with the electrolytic solution under a reduced pressure, and was held between the anode and the cathode. An aluminum plate and a copper plate were prepared on the cathode and anode sides, respectively, whereas the anode, separator, and cathode were arranged between these plates. They were brought into contact with each other, so as to construct a measurement cell for an electrochemical capacitor evaluation test. The electric capacity of thus produced electrochemical capacitor was measured according to a constant-current charging/discharging method. Table 1 shows the result.

TABLE 1

| | Electric capacity/F · $g^{-1}$ |
|---|---|
| Example 1 | 44 |
| Example 2 | 35 |
| Comparative Example 1 | 30 |

Cross-Sectional Observation of Active Material Containing Layer

SEM and TEM photographs of cross sections of active material containing layers obtained by Examples 1 and 2 and Comparative Example 1 were taken according to the following procedure, and the inner structure of each active material containing layer was observed.

Each of the active material containing layers obtained by Examples 1 and 2 and Comparative Example 1 was partly punched out into a rectangular piece (5 mm×5 mm). Each piece was impregnated with a resin (epoxy resin), and then its surface was polished. Subsequently, using a microtome, measurement samples (each having a size of 0.1 mm×0.1 mm) for SEM and TEM photograph observations were obtained from each piece. Then, for each measurement sample, SEM and TEM photographs were taken.

FIGS. 12 to 19 show results of SEM and TEM photographs taken at cross sections of the active material containing layers in Example 1.

Figure 12:
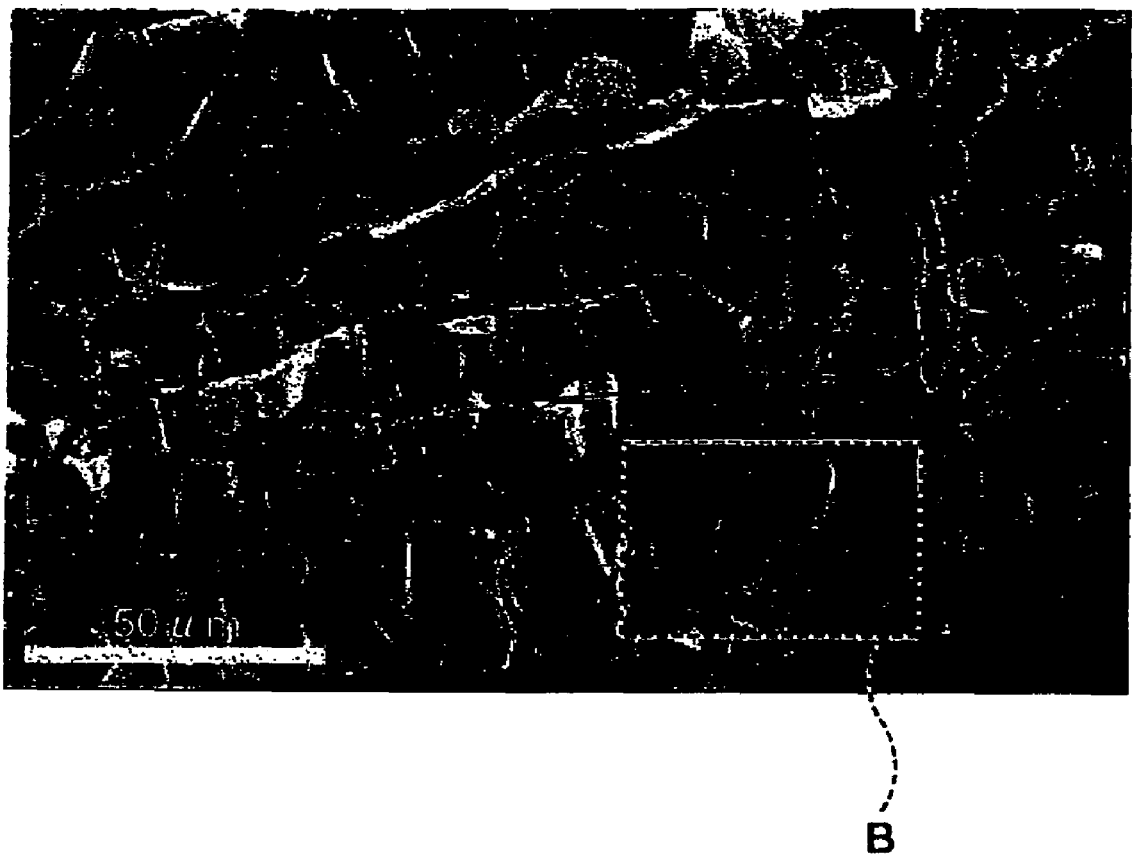
FIG. 12 is a view showing a SEM photograph taking a cross section of the active material containing layer in Example 1 made by the manufacturing method (dry method) in accordance with the present invention.
Figure 13:
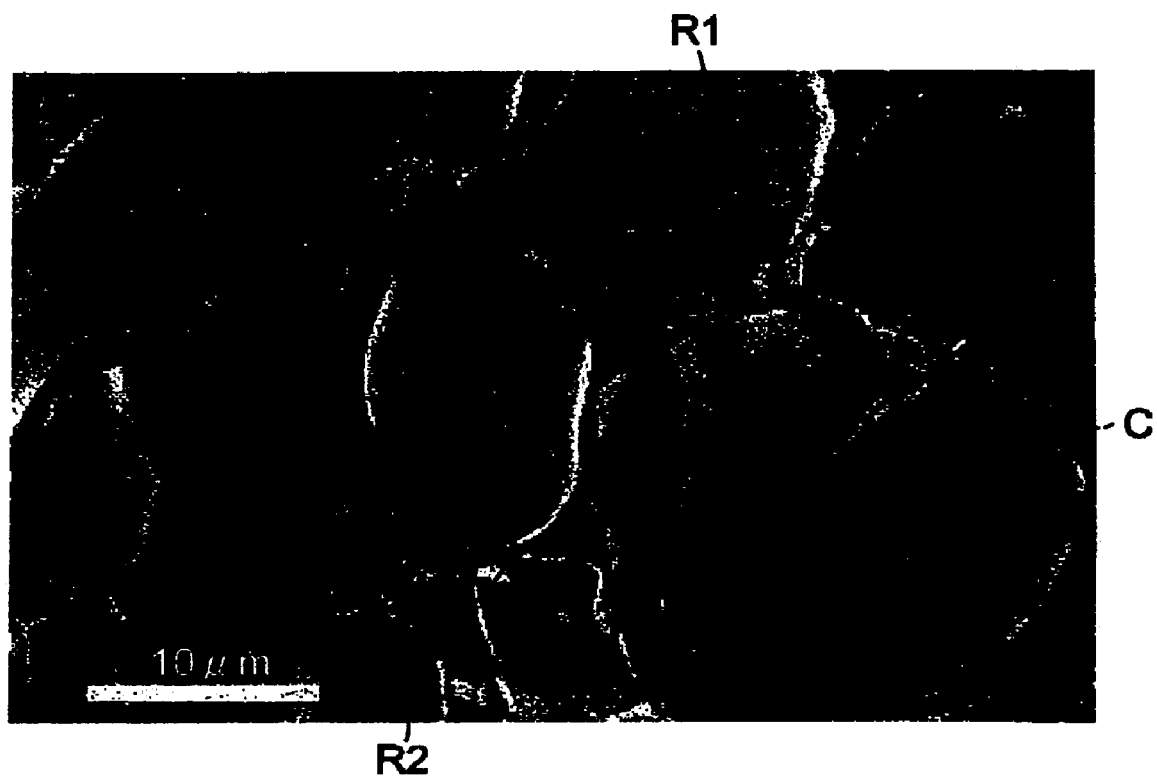
FIG. 13 is an enlarged view showing part B of FIG. 12.
Figure 14:
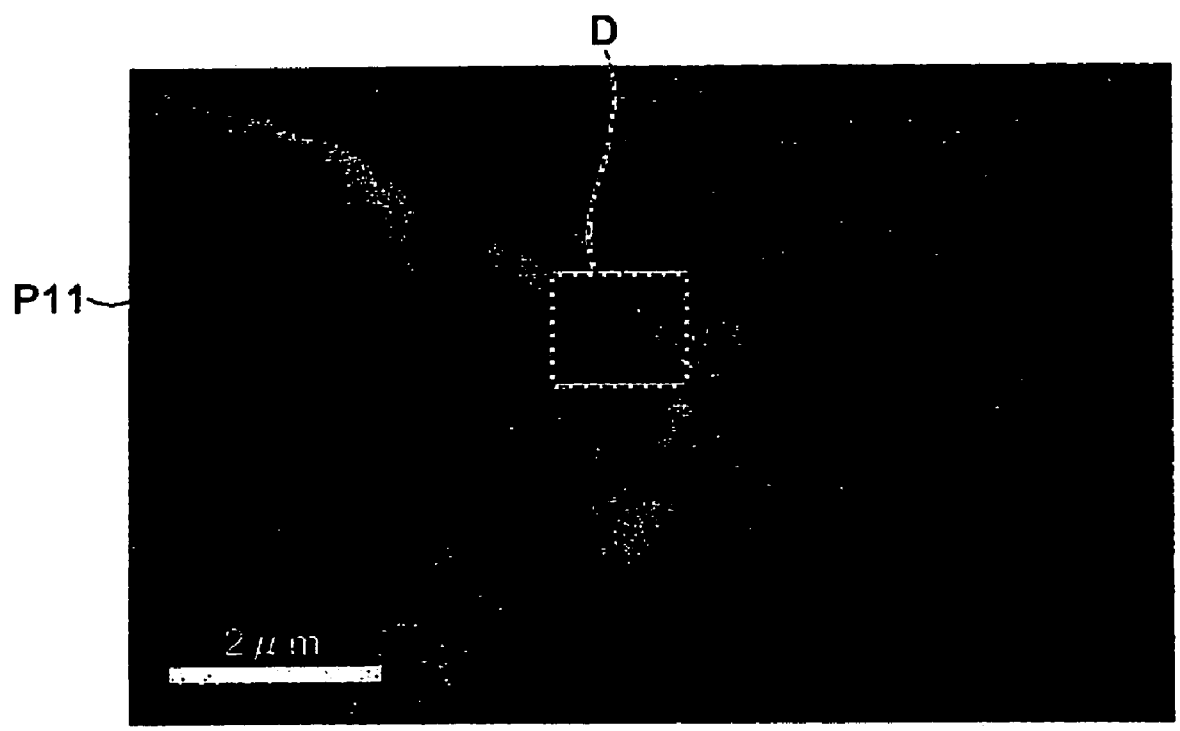
FIG. 14 is an enlarged view showing part C of FIG. 13.
Figure 15:
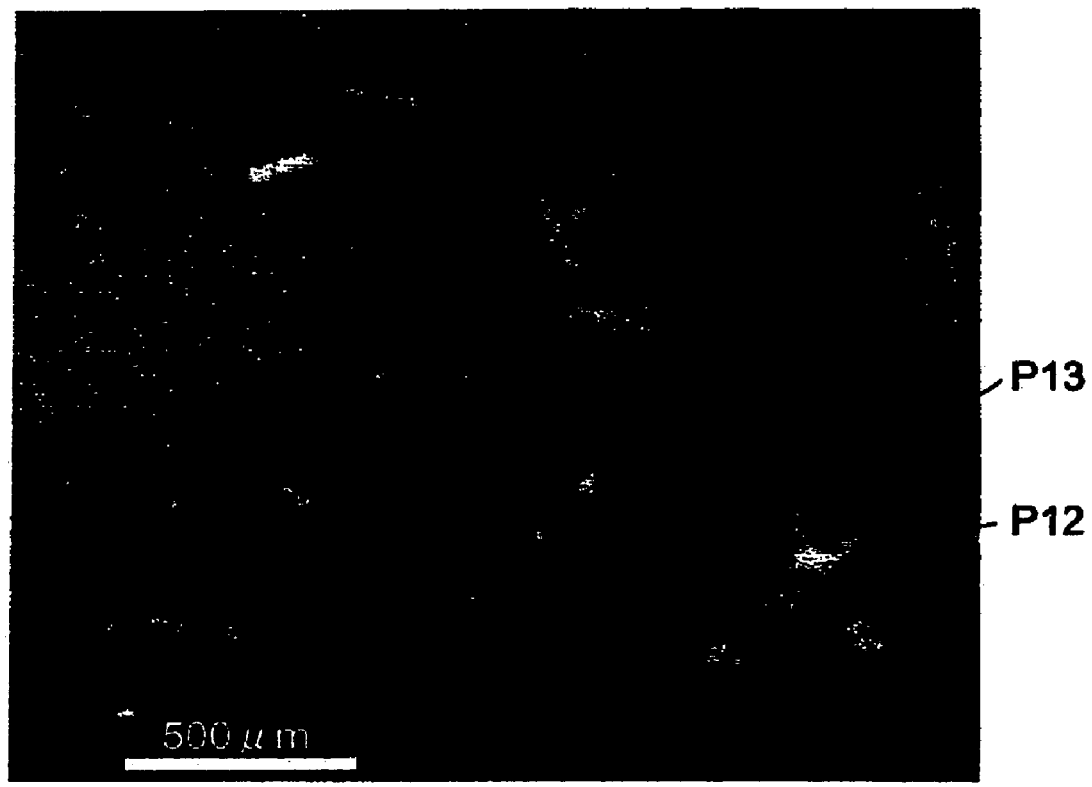
FIG. 15 is an enlarged view showing part D of FIG. 14.

FIG. 12 is a view showing a SEM photograph taken at a cross section of the active material containing layer in accordance with Example 1 made by the manufacturing method (dry method) of the present invention. FIG. 13 is an enlarged view showing part B of FIG. 12. FIG. 14 is an enlarged view showing part C of FIG. 13. FIG. 15 is an enlarged view showing part D of FIG. 14.

Figure 16:
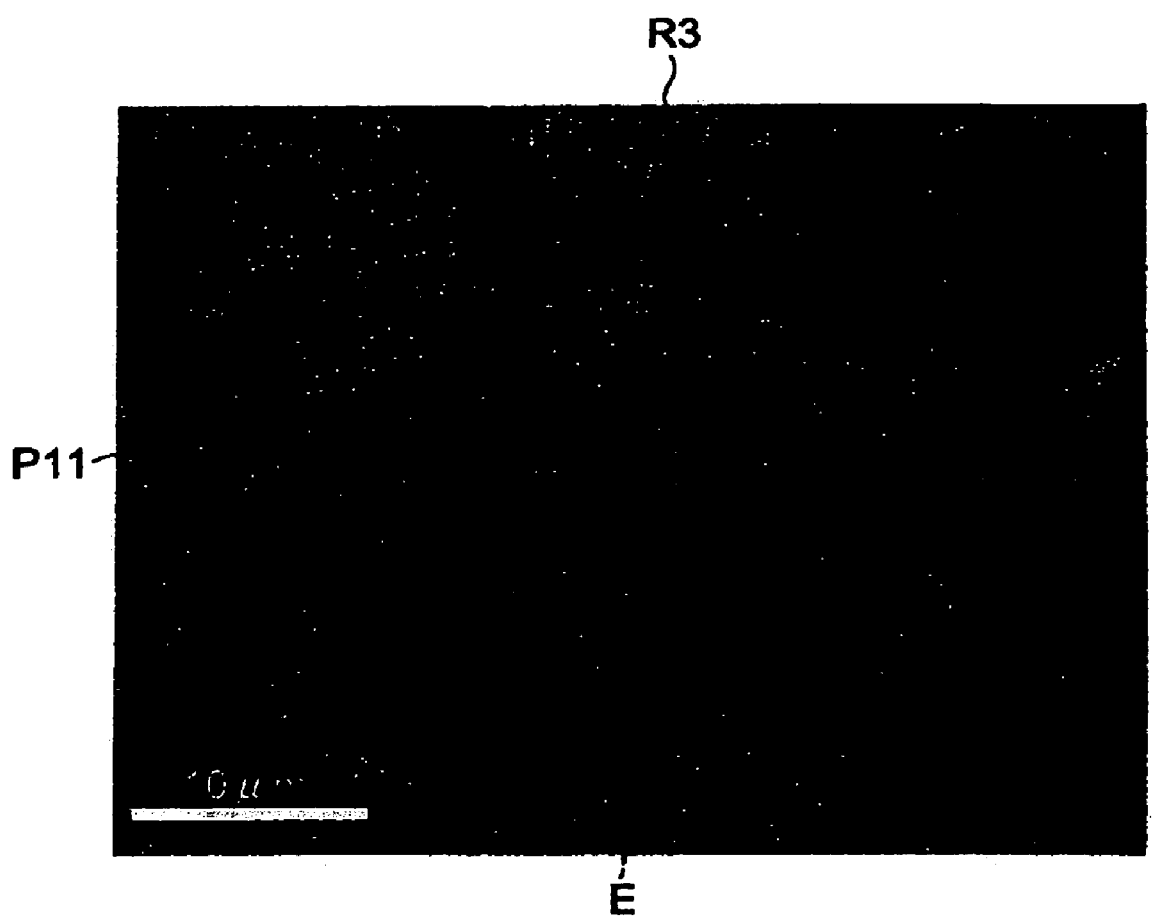
FIG. 16 is a view showing a TEM photograph taking a cross section of the active material containing layer in Example 1 made by the manufacturing method (dry method) in accordance with the present invention.
Figure 17:
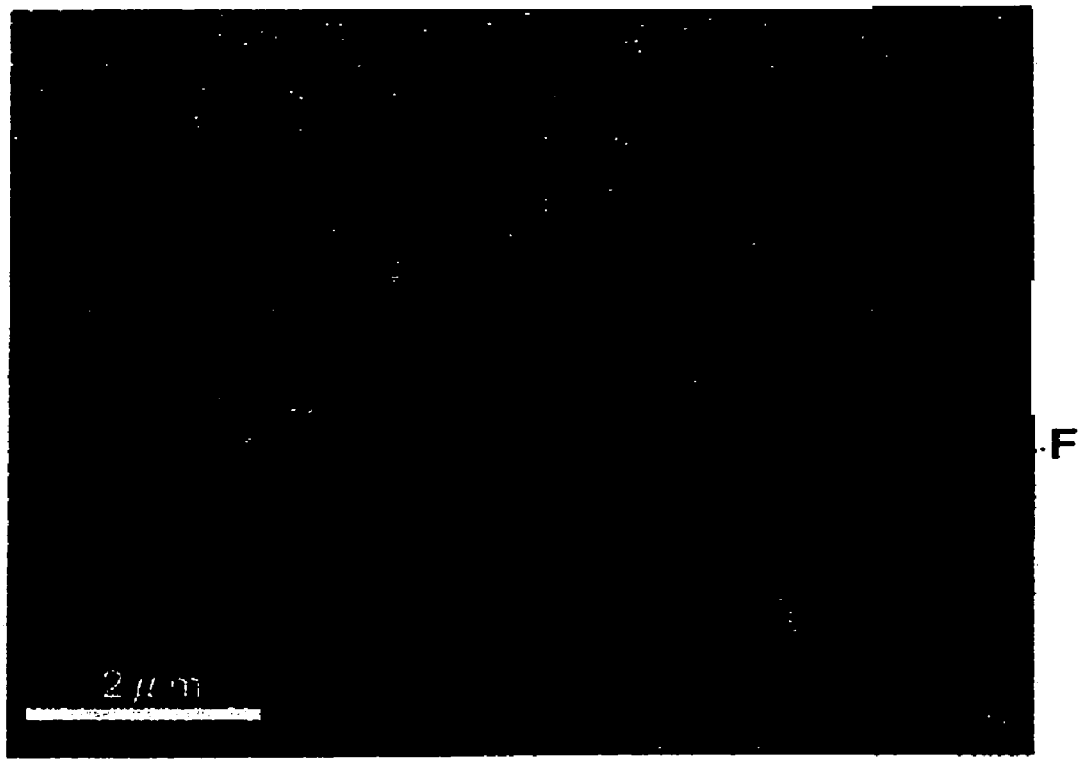
FIG. 17 is an enlarged view showing part E of FIG. 16.
Figure 18:
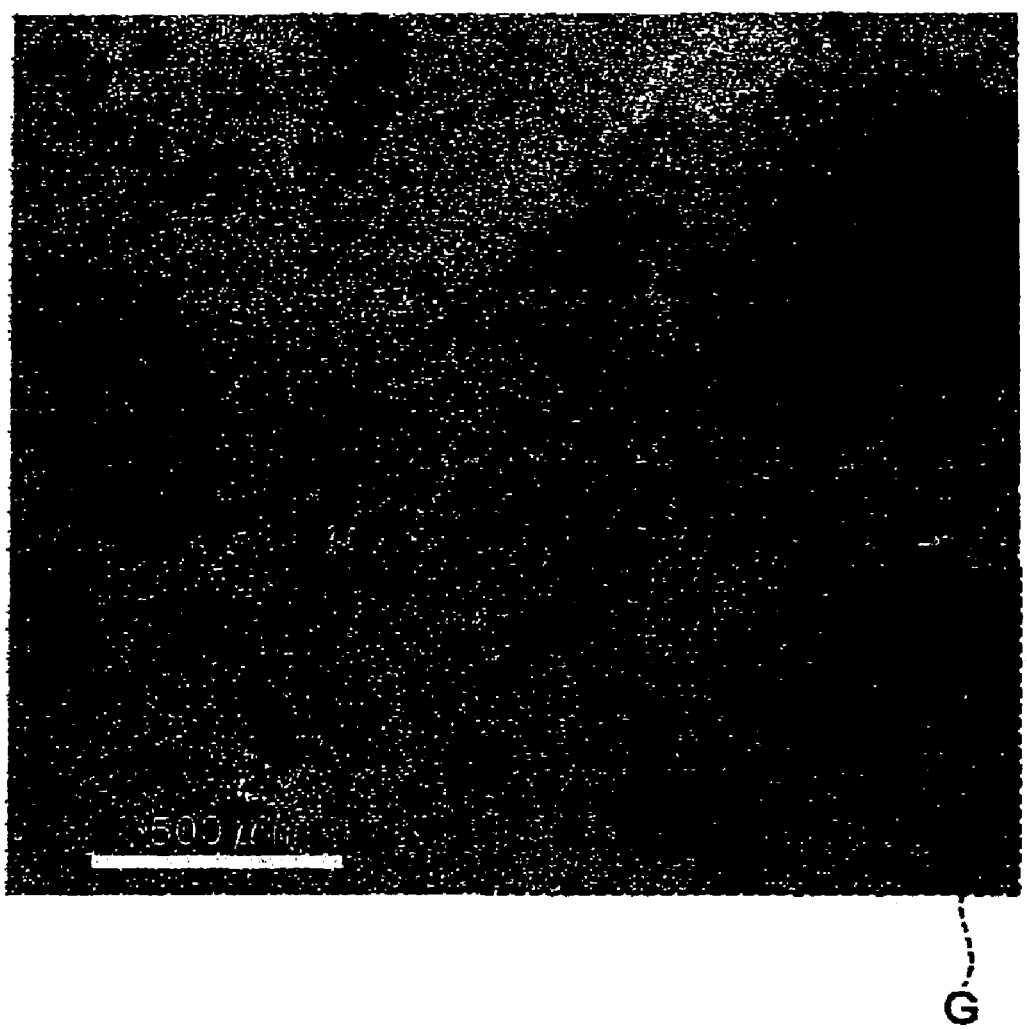
FIG. 18 is an enlarged view showing part F of FIG. 17.
Figure 19:
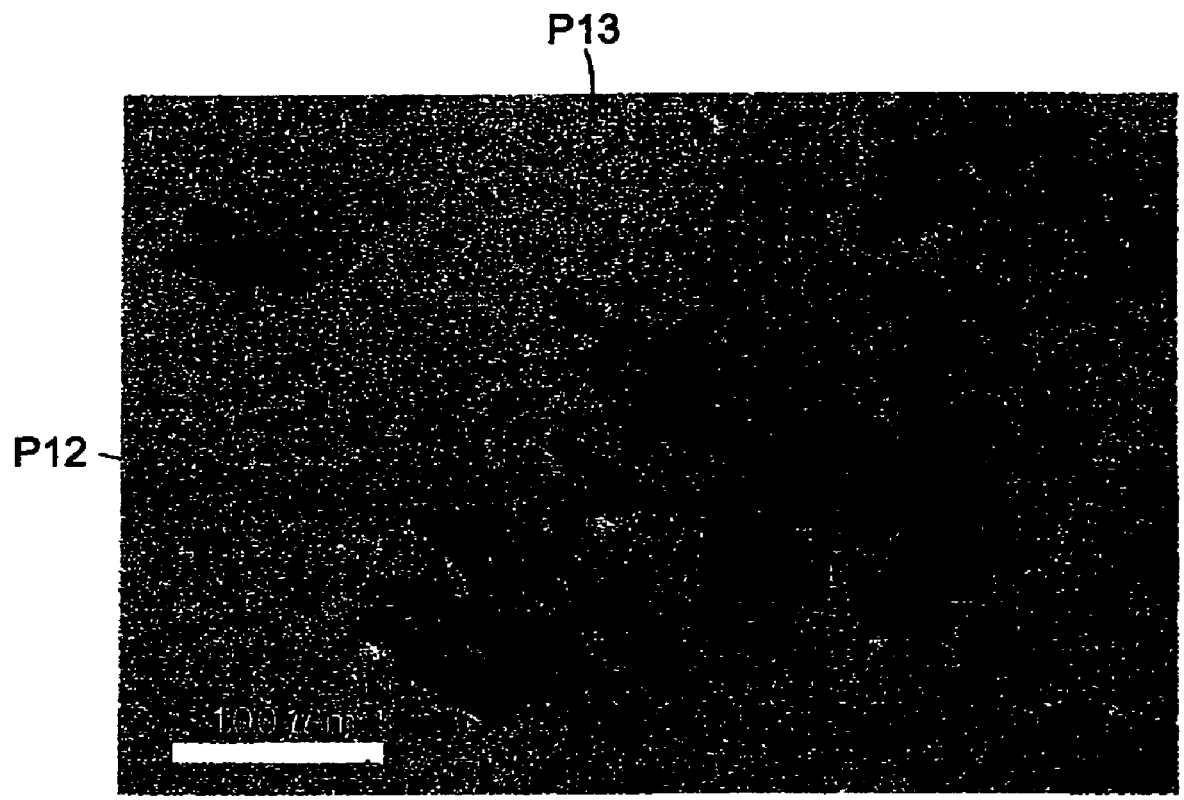
FIG. 19 is an enlarged view showing part G of FIG. 17.

FIG. 16 is a view showing a TEM photograph taken at a cross section of the active material containing layer in accordance with Example 1 made by the manufacturing method (dry method) of the present invention. FIG. 17 is an enlarged view showing part E of FIG. 16. FIG. 18 is an enlarged view showing part F of FIG. 17. FIG. 19 is an enlarged view showing part G of FIG. 18.

As can be seen from the results shown in FIGS. 12 to 19, the active material containing layer of Example 1 has the following structure. For example, results of observation of the part C (photographed area) and photographed areas R1 and R2 in FIG. 13 and results of observation of the part E (photographed area) and photographed area of R3 in FIG. 14 clarify that active carbon particles disposed close to each other are electrically and physically connected by an aggregate constituted by the redox particle, conductive auxiliary agent, and binder, so that favorable electron conduction networks and ion conduction networks are formed.

The inner structure of the active material containing layer mentioned above is more clearly seen from results of observation of FIG. 14 which is a photograph enlarging the part C in FIG. 13 and FIG. 15 which is a photograph enlarging the part D in FIG. 14, as well as results of observation of FIG. 17 which is a photograph enlarging the part E in FIG. 16, FIG. 18 which is a photograph enlarging the part F in FIG. 17, and FIG. 19 which is a photograph enlarging the part G in FIG. 18. Here, P11 in FIGS. 14 and 16 indicates active carbon, whereas P12 and P13 in FIGS. 15 and 19 indicate a primary particle of carbon black and a primary particle of $\alpha$-$Fe_2O_3$, respectively.

What is claimed is:

1. An electrochemical capacitor comprising, at least, a first electrode, a second electrode, and an electrolyte layer having an ionic conductivity, the first and second electrodes opposing each other by way of the electrolyte layer;
    wherein at least one of the first and second electrodes is an electrode comprising at least:
        a conductive active material containing layer containing, as a constituent material, a composite particle including an electrode active material including activated carbon, a conductive auxiliary agent having an electronic conductivity, and an oxidizing/reducing agent including $\alpha$-$Fe_2O_3$; and
        a conductive collector disposed in a state electrically in contact with the active material containing layer.

2. A method of making an electrochemical capacitor comprising, at least, a first electrode, a second electrode, and an electrolyte layer having an ionic conductivity, the first and second electrodes opposing each other by way of the electrolyte layer;
    the method comprising:
        a composite particle forming step of forming a composite particle by way of a granulating step of bringing a conductive auxiliary agent and an oxidizing/reducing agent including $\alpha$-$Fe_2O_3$ into close contact with a particle made of an electrode active material including activated carbon and integrating them together so as to form a composite particle containing the electrode active material, the conductive auxiliary agent, and the oxidizing/reducing agent; and
        an electrode forming step of forming at least one of the first and second electrodes by way of an active material containing layer forming step of forming an active material containing layer by using the composite particle at a part to be formed with the active material containing layer in a collector.

* * * * *